US008767120B2

(12) United States Patent
Takizawa

(10) Patent No.: US 8,767,120 B2
(45) Date of Patent: Jul. 1, 2014

(54) CAMERA DRIVE DEVICE

(75) Inventor: Teruyuki Takizawa, Osaka (JP)

(73) Assignee: Panasonic Corporation, Osaka (JP)

( * ) Notice: Subject to any disclaimer, the term of this patent is extended or adjusted under 35 U.S.C. 154(b) by 97 days.

(21) Appl. No.: 13/498,930

(22) PCT Filed: Jun. 29, 2011

(86) PCT No.: PCT/JP2011/003723
§ 371 (c)(1),
(2), (4) Date: Mar. 29, 2012

(87) PCT Pub. No.: WO2012/004952
PCT Pub. Date: Jan. 12, 2012

(65) Prior Publication Data
US 2012/0188441 A1 Jul. 26, 2012

(30) Foreign Application Priority Data

Jul. 7, 2010 (JP) .................................. 2010-154520

(51) Int. Cl.
*H04N 5/225* (2006.01)
(52) U.S. Cl.
USPC ...................... 348/374; 348/208.7; 348/208.3
(58) Field of Classification Search
CPC  H04N 5/2253; H04N 5/2251; H04N 5/23248
USPC ................ 348/373–375, 208.3, 208.4, 208.7, 348/208.11
See application file for complete search history.

(56) References Cited

U.S. PATENT DOCUMENTS 5,502,598 A * 3/1996 Kimura et al. ................ 359/814
5,956,529 A 9/1999 Lee et al.
6,734,914 B1 * 5/2004 Nishimura et al. ........... 348/375

(Continued)

FOREIGN PATENT DOCUMENTS

JP         11-220651 A      8/1999
JP       2005-311758 A     11/2005

(Continued)

OTHER PUBLICATIONS

International Search Report for corresponding International Application No. PCT/JP2011/003723 mailed Oct. 25, 2011.

(Continued)

*Primary Examiner* — Tuan Ho
*Assistant Examiner* — Zhenzhen Wu
(74) *Attorney, Agent, or Firm* — Renner, Otto, Boisselle & Sklar, LLP

(57) ABSTRACT

A camera driving apparatus according to the present invention includes: a camera portion having an imaging plane; a movable unit incorporating the camera portion, including an attracting magnet, and having an outer shape formed as a convex partial spherical surface; a fixing unit which includes a magnetic body and a concave portion to which the movable unit is loosely fitted, and in which a magnetic attraction force of the attracting magnet with respect to the magnetic body causes the convex partial spherical surface of the movable unit and the concave portion to be held in point contact or linear contact with each other, thereby enabling the movable unit to freely rotate about a spherical center of the first convex partial spherical surface; a panning drive portion; a tilting drive portion; a rolling drive portion; and a detector for detecting a tilt angle of the camera portion in a panning direction with respect to the fixing unit, a tilt angle of the camera portion in a tilting direction with respect to the fixing unit, and a rotation angle of the camera unit to be rotated in a rolling direction with respect to the fixing unit.

36 Claims, 23 Drawing Sheets

(56) References Cited

U.S. PATENT DOCUMENTS

| | | | |
|---|---|---|---|
| 7,459,834 B2 * | 12/2008 | Knowles et al. | 310/328 |
| 2006/0033818 A1 | 2/2006 | Wada et al. | |
| 2008/0124069 A1 | 5/2008 | Basho | |
| 2010/0111516 A1 | 5/2010 | Basho | |
| 2010/0202766 A1 * | 8/2010 | Takizawa et al. | 396/55 |
| 2011/0122495 A1 | 5/2011 | Togashi | |
| 2012/0169921 A1 * | 7/2012 | Hung | 348/374 |

FOREIGN PATENT DOCUMENTS

| | | |
|---|---|---|
| JP | 2006-053358 A | 2/2006 |
| JP | 2008-058391 A | 3/2008 |
| JP | 2008-141233 A | 6/2008 |
| JP | 2010-140386 A | 6/2010 |
| WO | 2010/010712 A1 | 1/2010 |

OTHER PUBLICATIONS

Form PCT/ISA/237 for corresponding International Application No. PCT/JP2011/003723 mailed Oct. 25, 2011 and Partial English translation.

* cited by examiner

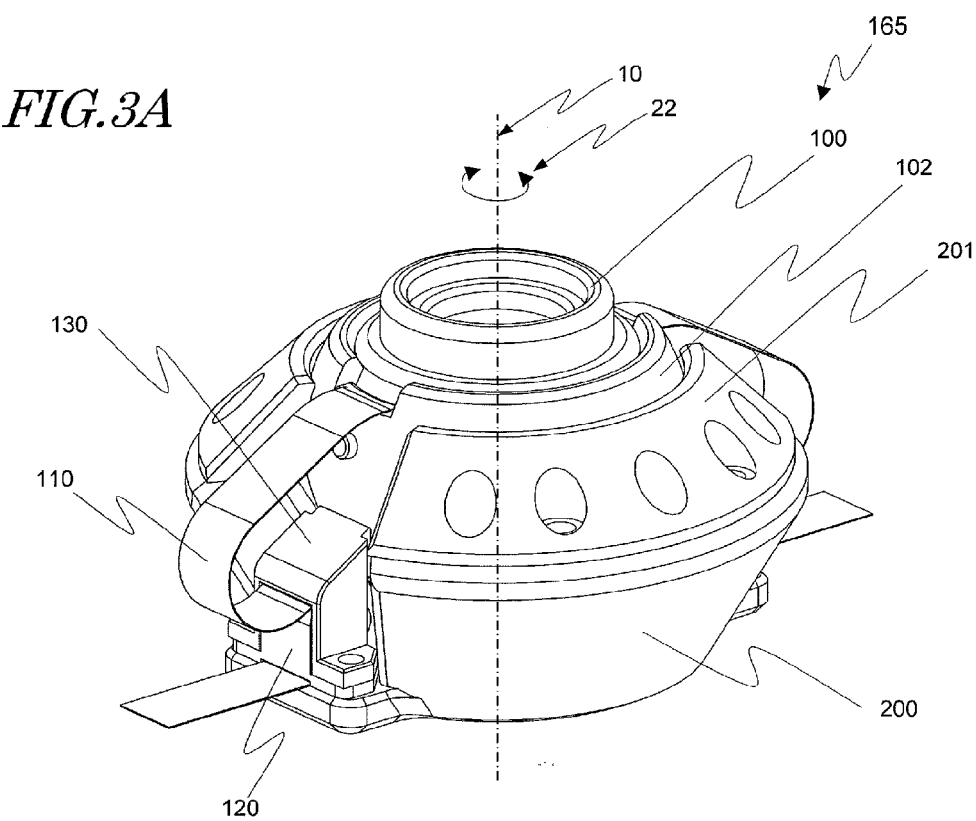
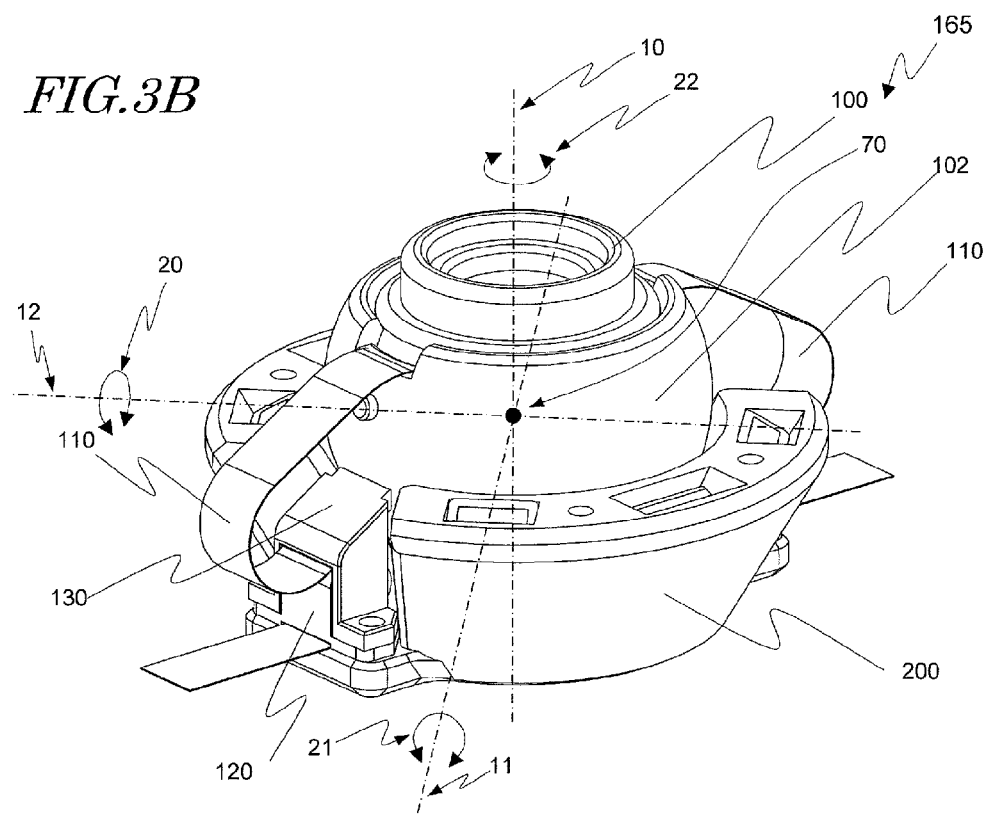

FIG.10
(a)
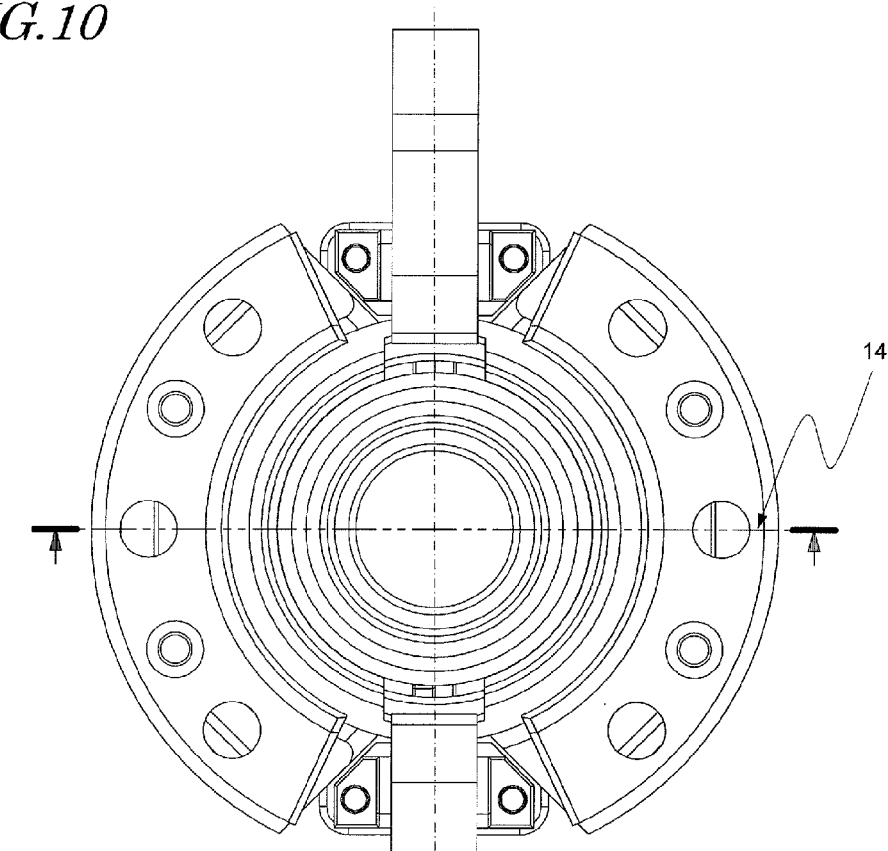
(b)
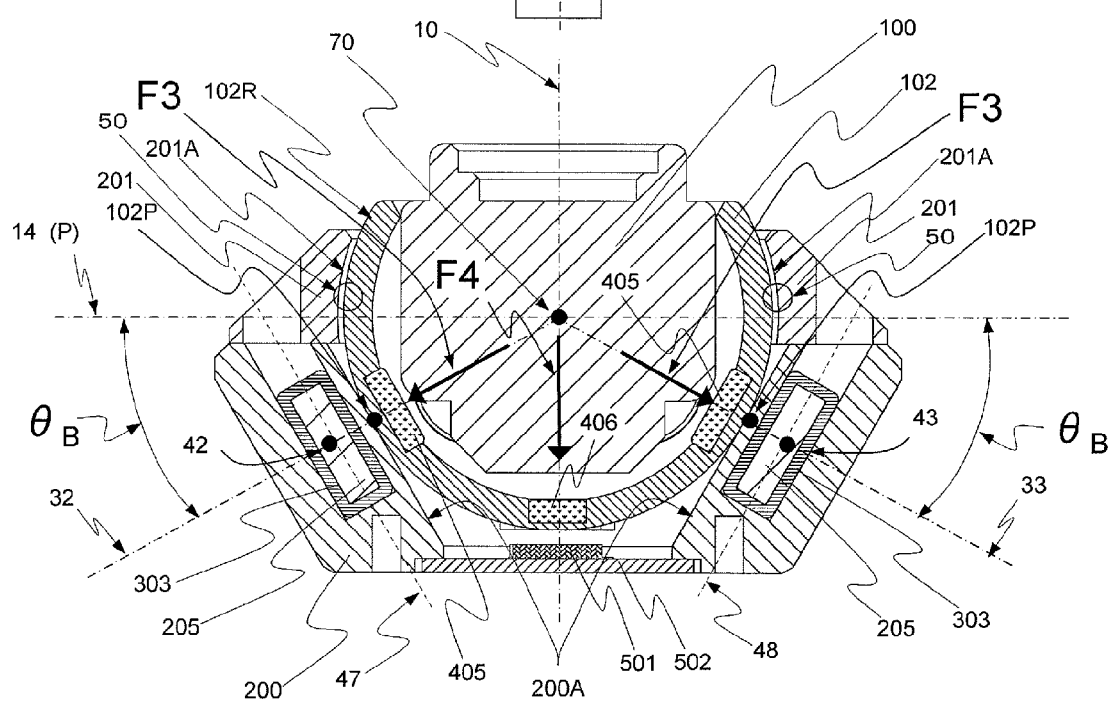

FIG.11
(a)
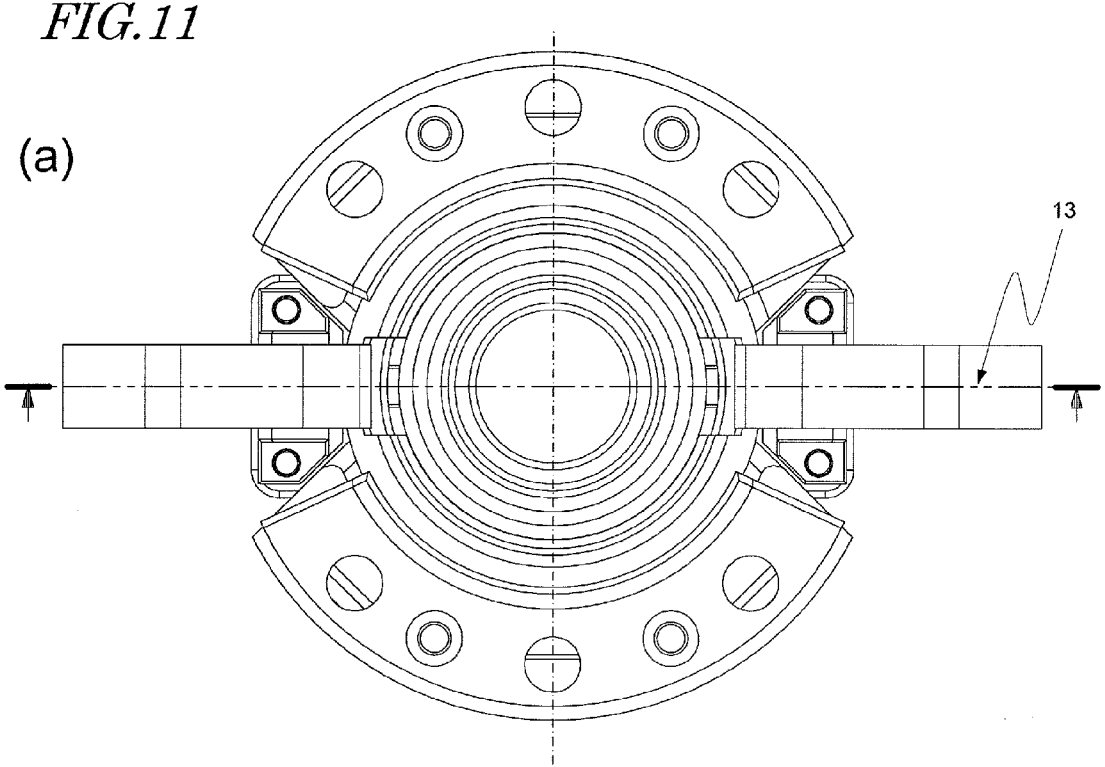
(b)
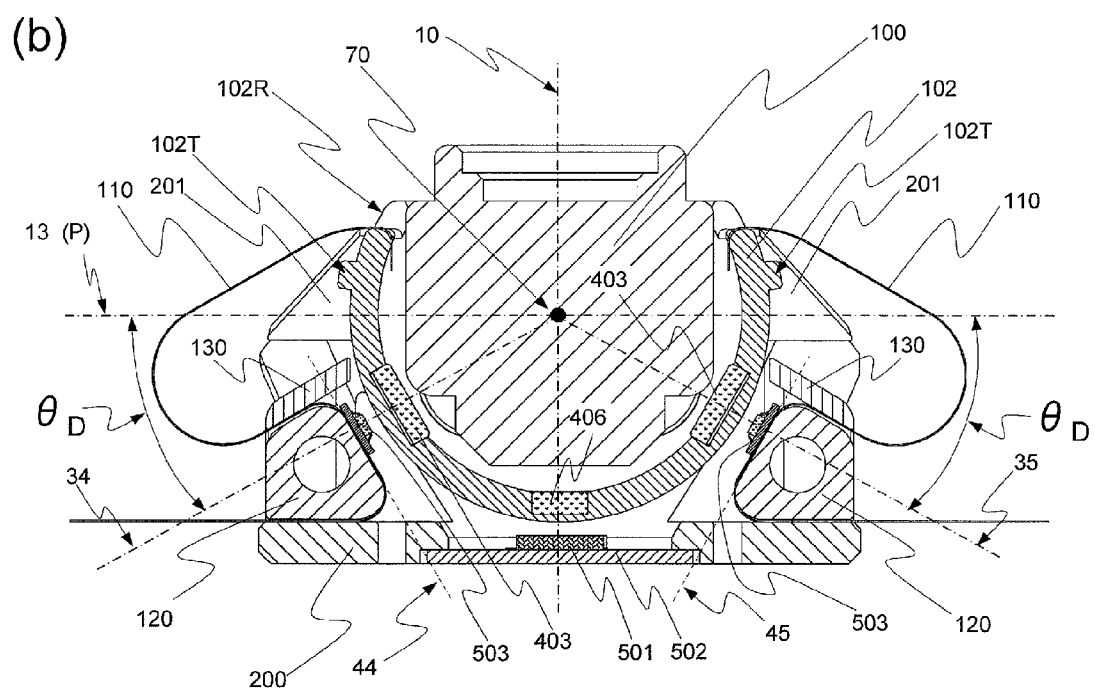

FIG. 13
(a)
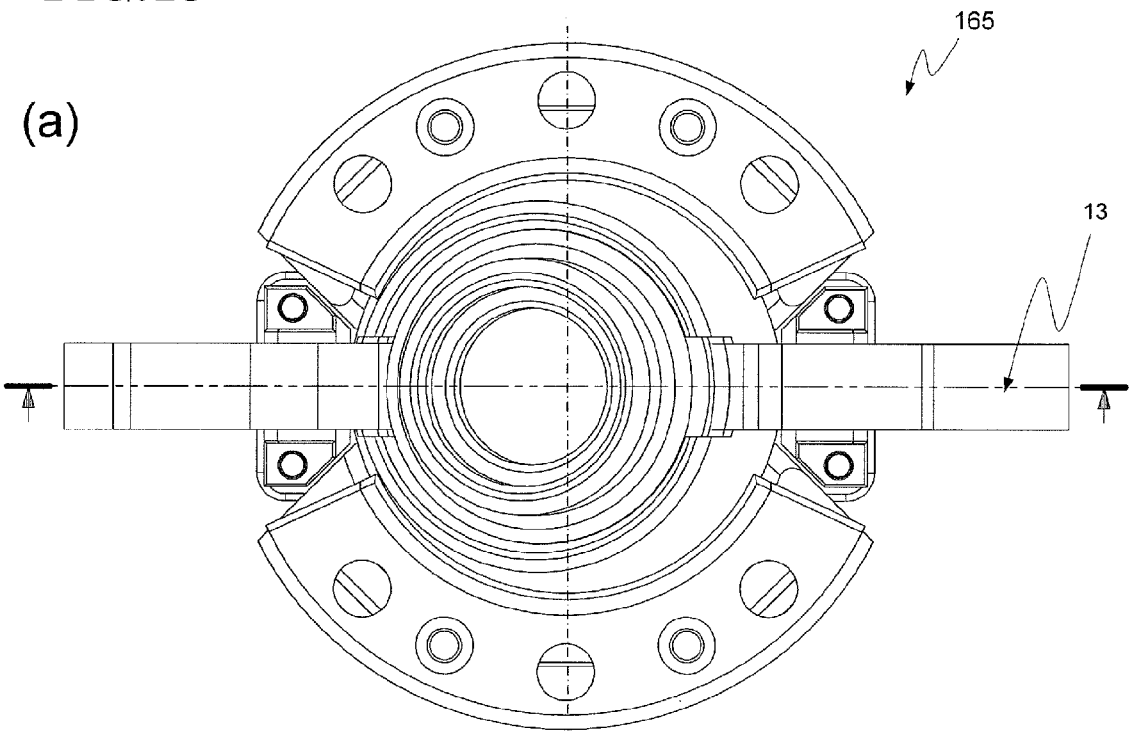
(b)
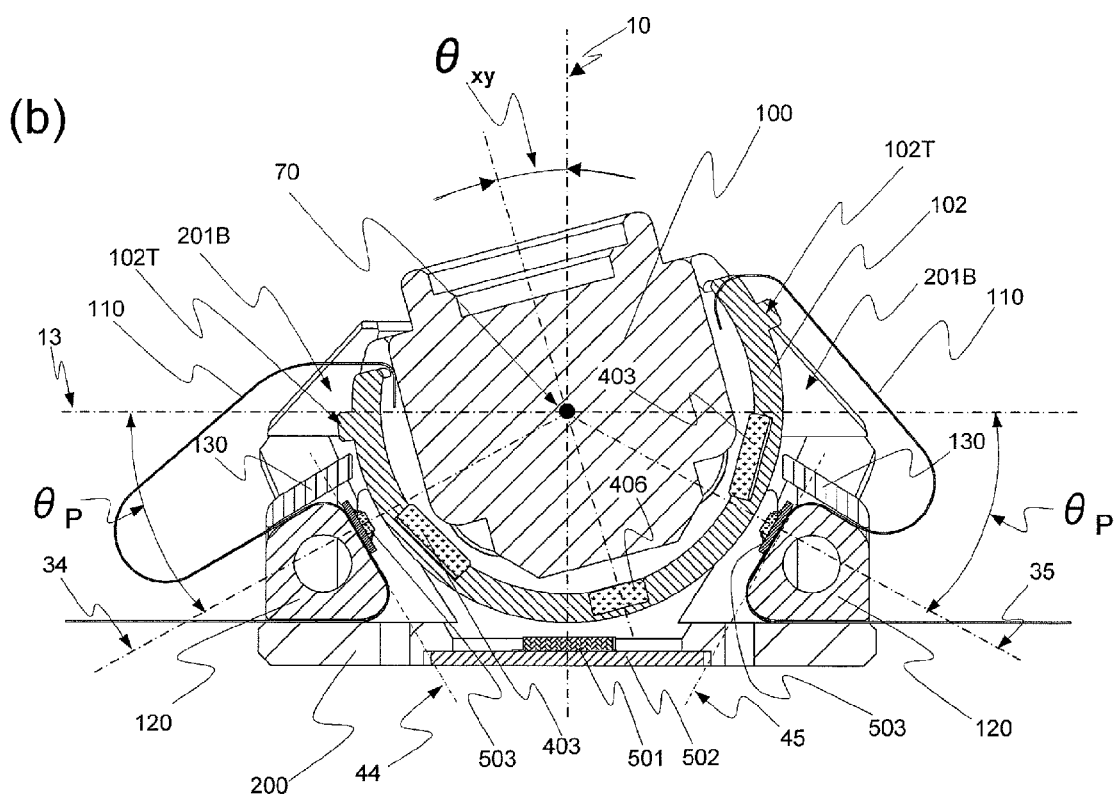

FIG.19
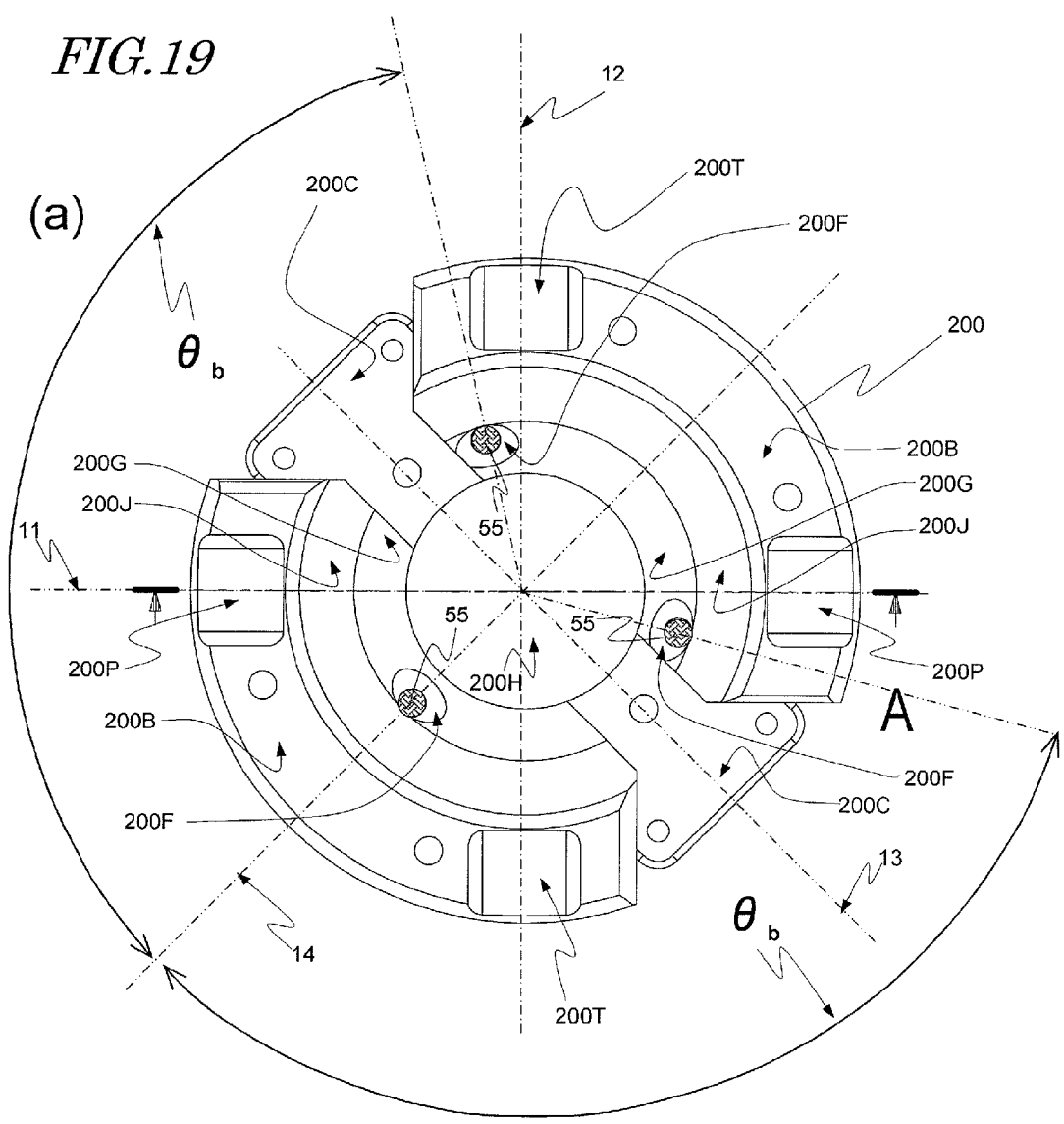
(a)
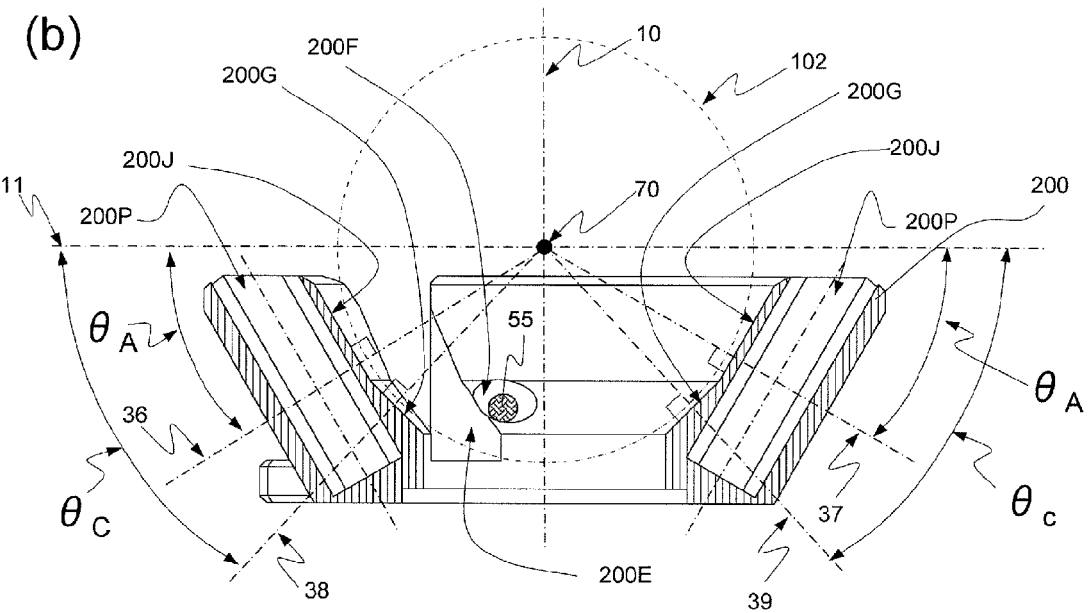
(b)

FIG.20
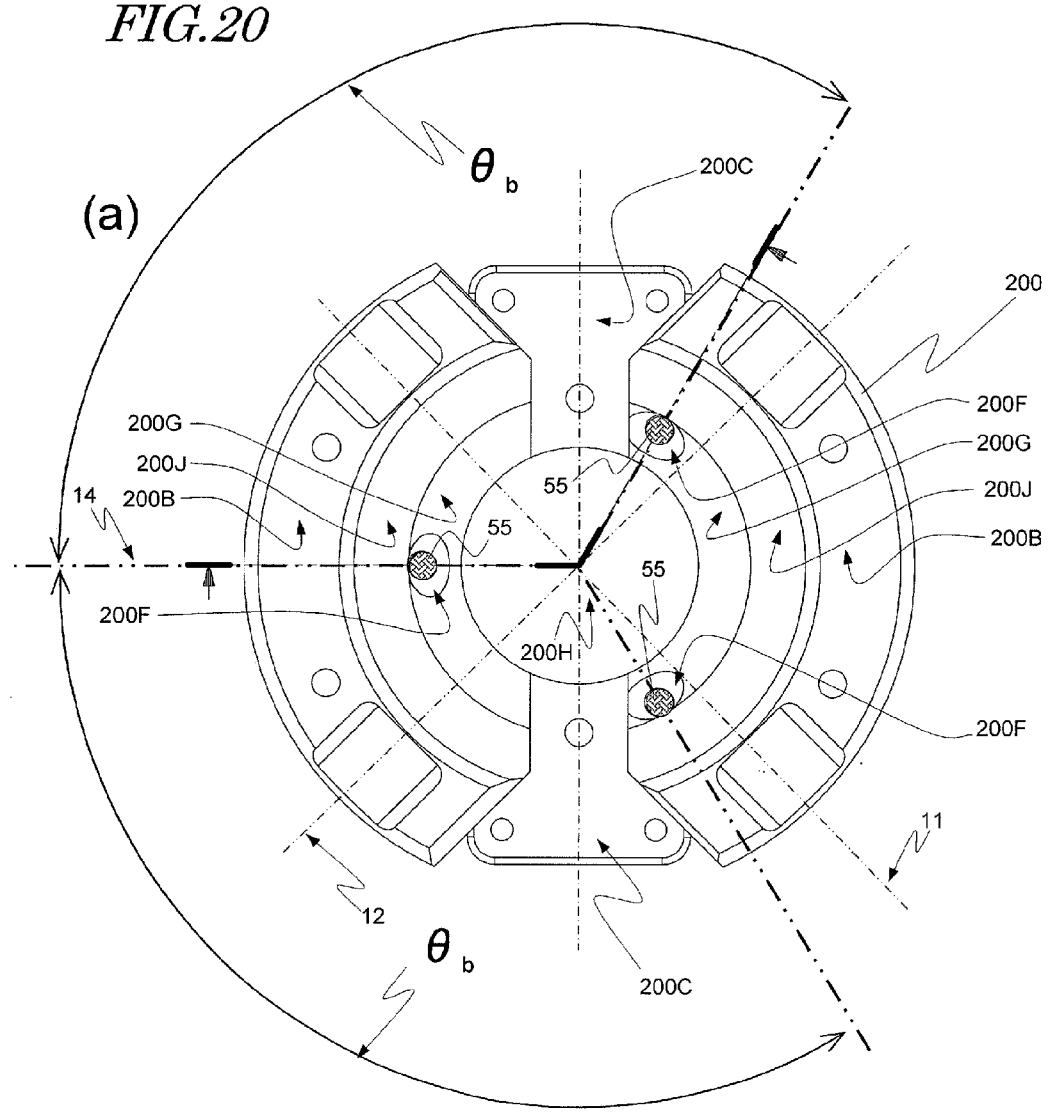
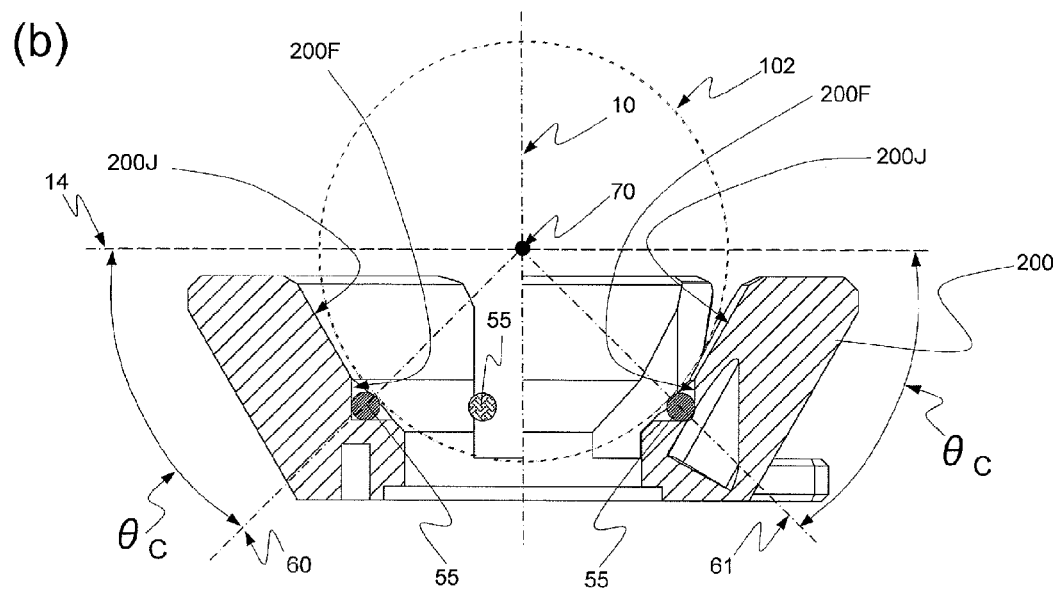

CAMERA DRIVE DEVICE

TECHNICAL FIELD

The present invention relates to a camera driving apparatus capable of tilting a camera portion including an imaging element in a panning (yawing) direction and a tilting (pitching) direction, and rotating (rolling) the camera portion about an optical axis of a lens.

BACKGROUND ART

Many of video cameras and digital cameras commercially available in recent years are provided with a camera-shake correction device for correcting image blurs of images-to-be-shot, which are caused by camera shake. In this camera-shake correction device, a lens, a lens barrel, a reflective mirror, an imaging element, and the like are tilted with respect to an optical axis of the camera, or two-dimensionally moved in a plane orthogonal to the optical axis.

For example, Patent Document No. 1 discloses a shake correction mechanism having a structure in which the lens barrel is elastically supported at one point and the lens barrel is tilted with respect to the optical axis. Patent Document No. 2 discloses a camera-shake correction device in which the mirror is supported by a pivotal structure and tilted with respect to the optical axis. Further, Patent Document No. 3 discloses an image pickup lens unit in which a spherical lens barrel is supported at three points, and is tilted while being moved along the optical axis.

CITATION LIST

Patent Literature

Patent Document No. 1: Japanese Patent Application Laid-Open Publication No. 2006-53358
Patent Document No. 2: Japanese Patent Application Laid-Open Publication No. 11-220651
Patent Document No. 3: Japanese Patent Application Laid-Open Publication No. 2008-58391

SUMMARY OF INVENTION

Technical Problems

Generally, a camera shake angle formed when a person performs photographing while standing still is said to be approximately ±0.3 degrees, and a frequency component generated in accordance therewith ranges approximately from 20 to 30 Hz. Further, it is said that camera-shake correction control is required to be performed in a frequency range of approximately 10 Hz.

As described above, when a photographer performs photographing with a video camera or a digital camera while standing still, the camera shake angle is relatively small, and the frequency for the control is also relatively low. Thus, regardless of the fact that components of the camera driving apparatus (lens, lens barrel, reflective mirror, imaging element, or the like) are tilted at minute tilt angles with respect to the optical axis of the lens and that the components are two-dimensionally and linearly moved by minute moving amounts in a plane orthogonal to the optical axis, conventional camera driving apparatus, which correct image blurs of an image to be taken caused by camera shake in a stand-still state, satisfactorily perform camera-shake correction.

However, an angle of the image blur, which is caused at the time of photographing while walking, that is, caused when a photographer takes moving images or still images while walking (hereinafter, this case is referred to as shake while walking, the shake while walking including camera shake), is, for example, ±10 degrees or more. It is said that control for correcting the shake while walking is required to be performed in a frequency range of approximately 50 Hz.

It is difficult for a support system for supporting the components and a drive system for driving the components of the conventional camera driving apparatus to cope with such a case where the angle of the image blur becomes large and the control is performed at higher frequency in accordance therewith.

For example, although the device of Patent Document No. 1 is suitable for tilting the lens barrel at a minute angle, deformation may occur up to a plastic region of an elastic body supporting the lens barrel when the lens barrel is tilted at a large angle of more than ±10 degrees. Further, when the tilt angle becomes larger, load derived from a spring coefficient of the elastic body becomes markedly large, and an amplitude increase coefficient (Q factor) of an inherent vibration of the elastic body increases in accordance therewith. As a result, phase characteristics and gain characteristics of the correction control are deteriorated, and it may be difficult to perform the correction control in the above-mentioned frequency range.

The device of Patent Document No. 2 drives the reflective mirror for the purpose of correcting image blurs. However, as for video cameras and digital cameras provided with a wide-angle lens system, when an attempt is made to provide the reflective mirror to an optical system, the reflective mirror becomes a large component in the optical system. Thus, it is difficult to say that the reflective mirror is a solution suitable for the video cameras and the digital cameras that have been demanded to be downsized. Further, the mirror is pivotally supported by a magnetic attraction force, and hence there is a risk that disturbance such as vibration and impact causes the mirror to drop off.

The lens holder of the lens unit of Patent Document No. 3 has a spherical shape, and hence the lens holder can be tilted at a large angle. However, rotational radii of parts at which the lens holder and a holder provided outside thereof come into contact with each other are large, and hence frictional load to a movable unit increases, and an operational moving distance becomes larger. Thus, when the tilt angle increases, frictional load generated by the contact greatly varies. As a result, it may be difficult to perform accurate control. Further, unless a clearance between the lens holder and the holder provided outside thereof is accurately controlled, it is difficult to accurately control a tilt angle of the lens holder. Depending on processing accuracies of those components, there is a risk that mechanical backlash occurs, which may deteriorate frequency response characteristics of the movable unit.

Further, none of the devices of Patent Document Nos. 1 to 3 has a structure in which the components including the lens are rotated about the optical axis of the camera portion.

The present invention has been made to solve at least one of those problems with the related arts. Specifically, it is an object of the present invention to provide a camera driving apparatus capable of rotating the camera portion in tri-axial directions. Further, it is another object of the present invention to provide an optical-device drive device rotatable at least in two directions.

Solution to Problem

The present invention provides a camera driving apparatus, including: a camera portion including: an imaging element having an imaging plane; a lens for forming an object image on the imaging plane, the lens having an optical axis; and a lens barrel for holding the lens; a movable unit including at least one attracting magnet, incorporating the camera portion, and having an outer shape formed as a first convex partial spherical surface; a fixing unit which includes at least one magnetic body and a concave portion to which at least a part of the movable unit is loosely fitted, and in which a magnetic attraction force of the at least one attracting magnet with respect to the at least one magnetic body causes the first convex partial spherical surface of the movable unit and the concave portion to be held in point contact or linear contact with each other, thereby enabling the movable unit to freely rotate about a spherical center of the first convex partial spherical surface; a panning drive portion for tilting the camera portion in a panning direction with respect to the fixing unit; a tilting drive portion for tilting the camera portion in a tilting direction, which is orthogonal to the panning direction, with respect to the fixing portion; a rolling drive portion for rotating the camera portion in a rolling direction, in which the camera portion is rotated about the optical axis of the lens, with respect to the fixing unit; and a detector for detecting: a tilt angle of the camera portion in the panning direction with respect to the fixing unit; a tilt angle of the camera portion in the tilting direction with respect to the fixing unit; and a rotation angle of the camera portion to be rotated in the rolling direction with respect to the fixing unit.

According to preferred embodiment of the present invention, the fixing unit has at least three second convex partial spherical surfaces to be positioned in the concave portion, the at least three second convex partial spherical surfaces and the first convex partial spherical surface of the movable unit being held in point contact with each other.

According to preferred embodiment of the present invention, the fixing unit has a concave conical surface forming an inner side surface of the concave portion, the concave conical surface and the first convex partial spherical surface of the movable unit being held in linear contact with each other.

According to preferred embodiment of the present invention, the camera driving apparatus further includes a drop-off preventing member provided to the fixing unit and having a regulating surface for restricting movement of the movable unit so as to prevent the movable unit from dropping off from the fixing unit, the regulating surface having a concave partial spherical surface having a center which coincides with the spherical center of the first convex partial spherical surface.

According to preferred embodiment of the present invention, the panning drive portion includes: a pair of panning drive magnets arranged in the movable unit symmetrically with respect to the optical axis; a pair of panning magnetic yokes arranged in the fixing unit so as to respectively face the pair of panning drive magnets; and a pair of panning drive coils wound respectively around the pair of panning magnetic yokes. The tilting drive portion includes: a pair of tilting drive magnets arranged in the movable unit symmetrically with respect to the optical axis; a pair of tilting magnetic yokes arranged in the fixing unit so as to respectively face the pair of tilting drive magnets; and a pair of tilting drive coils wound respectively around the pair of tilting magnetic yokes. Respective centers of the pair of panning drive magnets, respective centers of the pair of tilting drive magnets, respective centers of the pair of panning drive coils, and respective centers of the pair of tilting drive coils are positioned on respective straight lines each passing through the spherical center of the first convex partial spherical surface so that a position at which the respective straight lines intersect in a direction of the optical axis substantially coincides with a position of the spherical center of the first convex partial spherical surface.

According to preferred embodiment of the present invention, the rolling drive portion includes: a pair of rolling drive magnets arranged in the movable unit on a straight line passing through the optical axis, the pair of rolling drive magnets forming an angle of 45 degrees with respect to a straight line connecting the pair of panning drive magnets to each other and a straight line connecting the pair of tilting drive magnets to each other in a plane perpendicular to the optical axis; a pair of rolling magnetic yokes arranged in the fixing unit so as to respectively face the pair of rolling drive magnets; and a pair of rolling drive coils wound respectively around the pair of rolling magnetic yokes.

According to preferred embodiment of the present invention, the rolling drive portion includes four rolling drive coils wound respectively around the pair of the panning magnetic yokes and the pair of tilting magnetic yokes, and the pair of panning drive magnets and the pair of tilting drive magnets are used as rolling drive magnets.

According to preferred embodiment of the present invention, the magnetic body includes the pair of panning magnetic yokes, the pair of tilting magnetic yokes, and the pair of rolling magnetic yokes.

According to preferred embodiment of the present invention, the at least one magnetic body includes the pair of panning magnetic yokes and the pair of tilting magnetic yokes.

According to preferred embodiment of the present invention, the at least one attracting magnet includes the pair of panning drive magnets, the pair of tilting drive magnets, and the pair of rolling drive magnets.

According to preferred embodiment of the present invention, the attracting magnet includes the pair of panning drive magnets and the pair of tilting drive magnets.

According to preferred embodiment of the present invention, straight lines which are perpendicular to respective winding central axes of the pair of panning drive coils and pass through the spherical center of the first convex partial spherical surface and the pair of panning drive coils, and straight lines which are perpendicular to respective winding central axes of the pair of tilting drive coils and pass through the spherical center of the first convex partial spherical surface and the pair of tilting drive coils each form a tilt angle A of 45 degrees or less with respect to a horizontal plane which is perpendicular to the optical axis and includes the spherical center of the first convex partial spherical surface, and the pair of panning drive magnets and the pair of tilting drive magnets are arranged in the movable unit in a tilted manner so as to respectively face the pair of panning drive coils and the pair of tilting drive coils.

According to preferred embodiment of the present invention, straight lines which are perpendicular to respective winding central axes of the pair of rolling drive coils and pass through the spherical center of the first convex partial spherical surface each form a tilt angle B of 45 degrees or less with respect to a horizontal plane which is perpendicular to the optical axis and includes the spherical center of the first convex partial spherical surface and respective centers of the pair of rolling drive coils, and the pair of rolling drive magnets are arranged in the movable unit in a tilted manner so as to respectively face the pair of rolling drive coils.

According to preferred embodiment of the present invention, each of the tilt angle A and the tilt angle B is 20 degrees.

According to preferred embodiment of the present invention, straight lines respectively connecting spherical centers of the at least three second convex partial spherical surfaces and the spherical center of the first convex partial spherical surface each form a tilt angle C of 45 degrees with respect to a horizontal plane which is perpendicular to the optical axis and includes the spherical center of the first convex partial spherical surface.

According to preferred embodiment of the present invention, in the camera driving apparatus, the tilt angle A and the tilt angle B are different from the tilt angle C.

According to preferred embodiment of the present invention, the pair of panning drive magnets, the pair of tilting drive magnets, and the pair of rolling drive magnets are positioned on an inner side of the movable unit, and are prevented from being exposed on the first convex partial spherical surface.

According to preferred embodiment of the present invention, the pair of panning drive coils, the pair of tilting drive coils, and the pair of rolling drive coils are positioned inside the fixing unit, and are prevented from being exposed in the concave portion.

According to preferred embodiment of the present invention, the movable unit is made of a resin material.

According to preferred embodiment of the present invention, the movable unit is molded integrally with the pair of panning drive magnets, the pair of tilting drive magnets, and the pair of rolling drive magnets.

According to preferred embodiment of the present invention, the fixing unit is made of a resin material.

According to preferred embodiment of the present invention, the fixing unit is molded integrally with the pair of panning drive coils, the pair of tilting drive coils, the pair of rolling drive coils, the pair of panning magnetic yokes, the pair of tilting magnetic yokes, and the pair of rolling magnetic yokes.

According to preferred embodiment of the present invention, a center of gravity of the movable unit coincides with the spherical center of the first convex partial spherical surface.

According to preferred embodiment of the present invention, the camera drive further includes wiring components connected to the camera portion and each formed of a flexible printed wiring board. The wiring components are linearly symmetrically arranged with respect to the optical axis, and are fixed to the movable unit in a direction in which an angle of 45 degrees is formed with respect to a line connecting the pair of tilting drive magnets to each other or a line connecting the pair of panning drive magnets to each other in a plane perpendicular to the optical axis.

According to preferred embodiment of the present invention, the detector includes: a first detection portion for detecting the tilt angle of the camera portion in the panning direction with respect to the fixing unit, and the tilt angle of the camera portion in the tilting direction with respect to the fixing unit; and a second detection portion for detecting the rotation angle of the camera portion to be rotated about the optical axis.

According to preferred embodiment of the present invention, the first detection portion includes: a first magnetic sensor fixed to the fixing unit; and a tilt detecting magnet provided to the movable unit, the first magnetic sensor detecting a magnetic-force variation caused by a tilt of the tilt detecting magnet, thereby calculating a two-dimensional tilt angle in the panning direction and in the tilting direction of the camera portion.

According to preferred embodiment of the present invention, the first magnetic sensor and the tilt detecting magnet are positioned on the optical axis.

According to preferred embodiment of the present invention, the first detection portion includes: an optical sensor fixed to the fixing unit; and an optical detection pattern provided to a part of the first convex partial spherical surface of the movable unit, the optical sensor detecting a variation in light entering the optical sensor, the variation being caused by a tilt of the optical detection pattern, thereby calculating a two-dimensional tilt angle in the panning direction and in the tilting direction of the camera portion.

According to preferred embodiment of the present invention, the optical sensor and the optical detection pattern are positioned on the optical axis.

According to preferred embodiment of the present invention, the second detection portion includes: a pair of second magnetic sensors fixed to the fixing unit; and a pair of rotation detecting magnets provided to the movable unit, the pair of second magnetic sensors detecting a magnetic-force variation caused by rotation of the pair of rotation detecting magnets, thereby calculating the rotation angle of the camera portion.

According to preferred embodiment of the present invention, the pair of second magnetic sensors are arranged symmetrically with respect to the optical axis, and the pair of rotation detecting magnets are arranged symmetrically with respect to the optical axis.

According to preferred embodiment of the present invention, when the movable unit is at a neutral position, in the plane orthogonal to the optical axis, a straight line connecting the pair of second magnetic sensors to each other and the pair of rotation detecting magnets are arranged respectively on straight lines each forming an angle of 45 degrees with respect to the straight line connecting the pair of panning drive magnets and the straight line connecting the pair of tilting drive magnets.

According to preferred embodiment of the present invention, each of the pair of rotation detecting magnets is parallel to a straight line passing through the spherical center of the first convex partial spherical surface in the plane orthogonal to the optical axis and has two poles magnetized in directions opposite to each other, the two poles being arranged in a circumferential direction of a circle about the optical axis.

According to preferred embodiment of the present invention, the pair of second magnetic sensors are provided to the wiring components.

According to preferred embodiment of the present invention, the camera driving apparatus further includes a viscous member or a magnetic fluid provided between the regulating surface of the drop-off preventing member and the first convex partial spherical surface of the movable unit.

According to preferred embodiment of the present invention, a gap is provided between the regulating surface of the drop-off preventing member and the first convex partial spherical surface of the movable unit, the gap being set so that the first convex partial spherical surface of the movable unit restores a point contact state or a linear contact state by the magnetic attraction force even when the first convex partial spherical surface of the movable unit is spaced apart from the concave portion of the fixing unit.

The present invention provides a camera unit, including: the camera driving apparatus as described in any one of the embodiments described above; angular velocity sensors for respectively detecting angular velocities about three axes orthogonal to each other of the fixing unit; an arithmetic processing portion for generating target rotation angle signals based on outputs from the angular velocity sensors; and drive circuits for generating signals for driving the first drive portion and the second drive portion based on the target rotation angle signals.

The present invention provides an optical-device drive device, including: an optical device for receiving or emitting light, the optical device having an optical axis; a movable unit including at least one attracting magnet, incorporating the optical device, and having an outer shape formed as a first convex partial spherical surface; a fixing unit which includes at least one magnetic body and a concave portion to which at least a part of the movable unit is loosely fitted, and in which a magnetic attraction force of the at least one attracting magnet with respect to the at least one magnetic body causes the first convex partial spherical surface of the movable unit and the concave portion to be held in point contact or linear contact with each other, thereby enabling the movable unit to freely roll about a spherical center of the first convex partial spherical surface; a panning drive portion for tilting the optical device in a panning direction with respect to the fixing unit; a tilting drive portion for tilting the optical device in a tilting direction, which is orthogonal to the panning direction, with respect to the fixing portion; and a detector for detecting: a tilt angle of the camera portion in the panning direction with respect to the fixing unit; and a tilt angle of the camera portion in the tilting direction with respect to the fixing unit.

Advantageous Effects of Invention

The camera driving apparatus according to the present invention includes: the movable unit including the attracting magnet and the first convex partial spherical surface; and the fixing unit which includes the magnetic body and the concave portion to which at least the part of the movable unit is loosely fitted, and to which the movable unit is held in point contact or linear contact by the magnetic attraction force of the attracting magnet with respect to the magnetic body. Thus, the movable unit is freely rotated about the spherical center of the first convex partial spherical surface with respect to the fixing unit. Further, the magnetic attraction force causes the first convex partial spherical surface to be maintained in a state in which the first convex partial spherical surface is held in internal contact with the concave portion. Thus, regardless of a rotational state of the movable unit, load generated by the contact can be equalized.

Further, with a pivotal support structure in which the convex partial spherical surface is engaged with the concave portion, the movable unit can be supported at the center of gravity. Thus, mechanical resonance can be markedly suppressed in a control frequency range.

Still further, according to a specific embodiment of the present invention, the following advantage can be achieved. Specifically, the drop-off preventing member is provided, and hence the movable unit does not drop off even when impact from outside is applied to the movable unit, and can restore a state in which the convex partial spherical surface is held in contact with the concave portion.

Yet further, in the pivotal structure in which the convex partial spherical surface of the movable unit is held in internal contact with the concave conical surfaces of the fixing unit, when the magnetic attraction force free from influence of the rolling angle is added as a certain normal force, frictional load variation in accordance with the rolling angle can be suppressed, and satisfactory phase-and-gain characteristics can be obtained in a control-operation frequency range.

Yet further, the drop-off preventing regulating surface is provided to the drop-off preventing member to be fixed to the fixing unit. Thus, an operation at the time of incorporating the movable unit into the fixing unit is facilitated. With this, assembly properties can be markedly enhanced.

Yet further, the drive portion in the panning direction and the drive portion in the tilting direction are formed of the two pairs of drive magnets fixed to the movable unit and arranged orthogonally to each other and circumferentially around the optical axis, and the two pairs of drive coils fixed to the fixing unit so as to respectively face the two pairs of drive magnets.

Yet further, the drive portion in the rolling direction is formed of the pair of drive magnets fixed to the movable unit and arranged circumferentially around the optical axis, and the pair of drive coils fixed to the fixing unit so as to respectively face the pair of drive magnets.

Yet further, there is employed a structure of a moving magnet drive type in which the drive magnets are mounted to the movable unit. With this, supply of a drive electric current to the movable unit can be omitted.

Yet further, the vibration damping viscous member or the vibration damping magnetic fluid is filled into the substantially ring-shaped gap formed between the convex partial spherical surface of the movable unit and the drop-off preventing regulating surface of the fixing unit. Thus, an amplitude increase coefficient (Q factor) of a magnetic spring effect derived from the magnetic attraction force generated between the drive magnets provided to the movable unit and the magnetic yokes provided to the fixing unit and a Q factor of an inherent mechanical vibration can be reduced. With this, satisfactory control characteristics can be obtained.

Yet further, tilt detection means of the movable unit is formed of the tilt detecting magnet in a bottom portion of the movable portion and on the optical axis, and the first magnetic sensor provided to the fixing unit so as to face the tilt detecting magnet. With this, the magnetic-force variation of the tilt detecting magnet caused by the tilt of the movable unit is detected, whereby the tilt angles are calculated. As a result, the camera driving apparatus can be downsized.

Yet further, rotation detection means of the movable unit is formed of the pair of rotation detecting magnets including detecting magnets magnetized in a direction orthogonal to the optical axis and passing through the spherical center, each having two magnetic poles arranged in reverse to each other in the rolling direction in which the movable unit is rotated about the optical axis, and provided to the movable unit so as to be arranged symmetrically with respect to the optical axis. The rotation detection means of the movable unit is formed also of the pair of second magnetic sensors provided to the fixing unit so as to respectively face the pair of rotation detecting magnets. With this, the magnetic-force variation of the pair of rotation detecting magnets can be differentially detected, and crosstalk outputs generated in a case where the movable unit is rolled in the panning direction and the tilting direction can be cancelled. As a result, only the angle in the rolling direction can be extracted and detected within the range in which the movable unit can be rolled.

Yet further, when viewed from the direction of the optical axis, the rotation detection means is arranged at an angle of 45 degrees with respect to each of the panning drive portion and the tilting drive portion. In this way, the plurality of drive portions are provided on the circumference about the optical axis so as to enhance a drive moment force. In addition, the rotation detection means is provided on the same circumference. With this, space saving of the camera driving apparatus as a whole can be achieved.

Yet further, in the rolling drive portion, the panning drive magnets and the tilting drive magnets are used also as the rolling drive magnets. In addition, the rolling drive coils are wound crisscross around the panning magnetic yokes and the tilting magnetic yokes orthogonally to a coil winding direction of each of the panning drive coils and the tilting drive coils. With this, space saving and downsizing of the camera driving apparatus as a whole can be achieved, and the number of components can be reduced.

Yet further, the panning drive coils, the tilting drive coils, and the rolling drive coils fixed to the fixing unit, and the panning drive magnets, the tilting drive magnets, and the rolling drive magnets respectively facing the panning drive coils, the tilting drive coils, and the rolling drive coils and mounted to the movable unit are positioned at height positions tilted downward (20 degrees to 45 degrees) with respect to the horizontal plane which is orthogonal to the optical axis and includes the spherical center of the convex partial spherical surface of the movable unit. With this, the height of the camera driving apparatus can be reduced. The magnetic attraction force generated between the movable unit and the fixing unit can be obtained in a spreading manner from among the plurality of drive magnets and the plurality of magnetic yokes of the panning drive portion, the tilting drive portion, and the rolling drive portion. Thus, frictional resistance between the movable unit and the fixing unit, which is derived from a normal force, can be set to a certain value free from influence of the rolling angle.

Yet further, the panning drive magnets, the tilting drive magnets, and the rolling drive magnets are incorporated in the movable unit. In addition, the panning drive magnets, the tilting drive magnets, and the rolling drive magnets are not exposed on the convex partial spherical surface of the movable portion, which is held in contact with the concave conical surface of the fixing unit. Thus, a frictional coefficient between the movable unit and the fixing unit can be reduced.

Yet further, each of the concave conical surface of the fixing unit and the convex partial spherical surface of the movable portion is made of a plastic resin excellent in slidability. Thus, the frictional coefficient between the movable unit and the fixing unit can be further reduced. In addition, at least three or more support balls are interposed between the concave conical surface of the fixing unit and the convex partial spherical surface of the movable portion. Also with this, the frictional coefficient between the movable unit and the fixing unit can be further reduced.

Yet further, the panning drive portion, the tilting drive portion, and the rolling drive portion are provided at height positions at which the panning drive portion, the tilting drive portion, and the rolling drive portion are tilted downward at 30 degrees with respect to the horizontal plane which is orthogonal to the optical axis and includes the spherical center of the convex partial spherical surface of the movable unit. In addition, the support balls are provided at height positions at which the support balls are tilted downward at 45 degrees with respect to the horizontal plane. With this, it is possible to reduce both the frictional coefficient between the movable unit and the fixing unit and height of the camera driving apparatus as a whole.

Yet further, the fixing unit is made of a plastic resin, and hence the fixing unit can be molded integrally with the panning drive coils, the tilting drive coils, the rolling drive coils, the panning magnetic yokes, the tilting magnetic yokes, and the rolling magnetic coils, which are components of the fixing unit. Thus, cost reduction of the camera driving apparatus can be achieved.

Yet further, the movable unit is made of a plastic resin, and hence the movable unit can be molded integrally with the panning drive magnets, the tilting drive magnets, the rolling drive magnets, the rotation detecting magnets, and the tilt detecting magnet, which are components of the movable unit. Thus, cost reduction of the camera driving apparatus can be achieved.

Yet further, each of the concave conical surface of the fixing unit and the convex partial spherical surface of the movable portion is made of a plastic resin excellent in slidability. Thus, the frictional coefficient between the movable unit and the fixing unit can be further reduced. In addition, the detecting portion for the tilt of the movable unit detects, with use of the optical sensor fixed to the fixing unit, the movement of the movable unit by the tilt of the drawing pattern printed on the part of convex partial spherical surface of the movable unit, thereby calculating the two-dimensional tilt angle in the panning direction and the tilting direction. Thus, cost reduction of the camera driving apparatus can be achieved.

As described above, according to the present invention, the movable unit can be supported at the center of gravity and driven about the center of gravity with the pivotal support structure. Thus, mechanical resonance can be markedly suppressed in the control frequency range. Further, with use of a drive support system capable of tilting drive at a large angle of ±10 degrees or more in the panning direction and the tilting direction and capable of rotation in the rolling direction, satisfactory blur-correction control can be performed in the wide-band frequency range of up to approximately 50 Hz. As a result, it is possible to provide a small and rigid camera driving apparatus capable of correcting image blurs caused by shake while walking.

BRIEF DESCRIPTION OF DRAWINGS

FIG. 3A is a perspective view in which the first embodiment of the present invention is viewed from above.

FIG. 3B is a perspective view in which the first embodiment of the present invention is viewed from above and drop-off preventing members 201 are omitted.

FIG. 10 illustrates, in parts (a) and (b), a top view of the first embodiment of the present invention and a sectional view taken along a plane including the optical axis 10 and a straight line 14, respectively.

FIG. 11 illustrates, in parts (a) and (b), a top view of the first embodiment of the present invention and a sectional view taken along a plane including the optical axis 10 and a straight line 13, respectively.

FIGS. 13(a) and 13(b) are a top view illustrating the first embodiment of the present invention and a sectional view taken along the plane including the optical axis 10 and the straight line 13 under the state in which the movable unit is tilted at the same angle in each of the panning direction 20 and the tilting direction 21, that is, tilted at the resultant angle $\theta_{xy}$.

FIGS. 19(a) and (b) are a top view of the fixing unit and a sectional view taken along a plane including the optical axis 10 and a tilting direction rotation axis 11, respectively, according to the second embodiment of the present invention.

FIGS. 20(a) and (b) are a top view of the fixing unit and a revolved sectional view taken along a plane including the optical axis 10 and centers of the support balls 55, respectively, according to the second embodiment of the present invention.

DESCRIPTION OF EMBODIMENTS

First Embodiment

In the following, description is made of a camera driving apparatus according to a first embodiment of the present invention.

Figure 1:
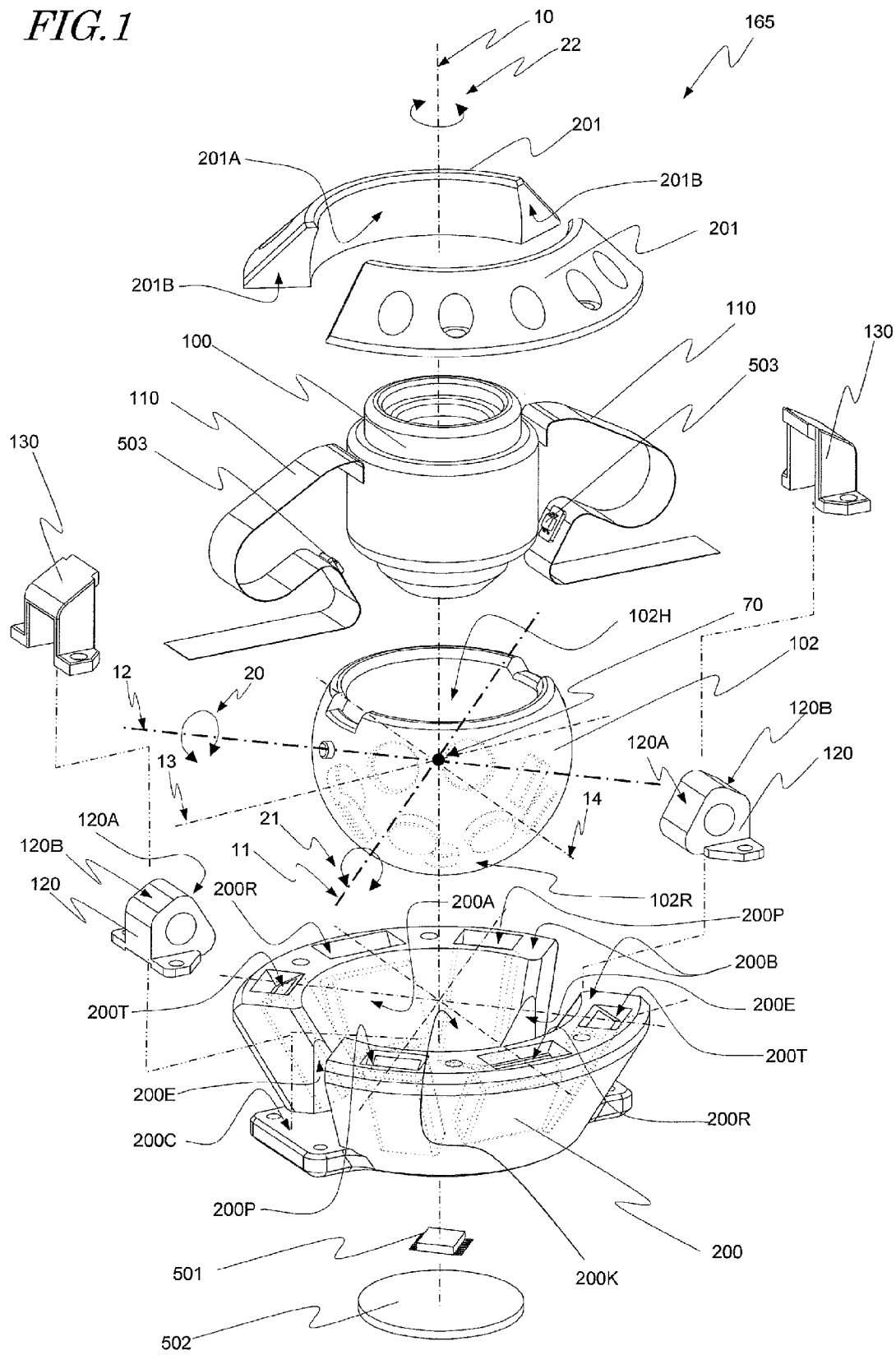
FIG. 1 is an exploded perspective view illustrating a schematic structure of a first embodiment of the present invention.
Figure 2:
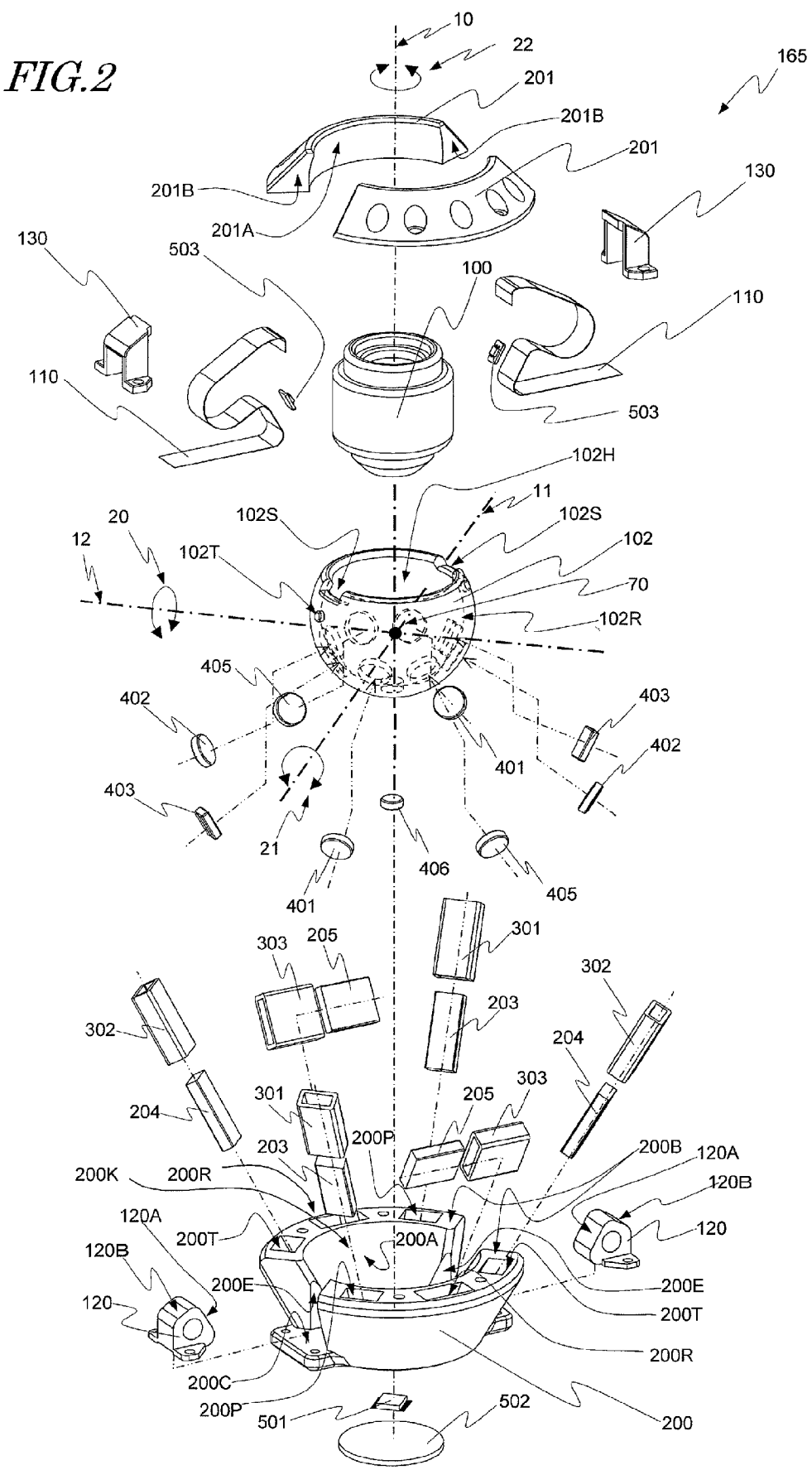
FIG. 2 is an exploded perspective view illustrating in detail the structure of the first embodiment of the present invention.
Figure 4A:
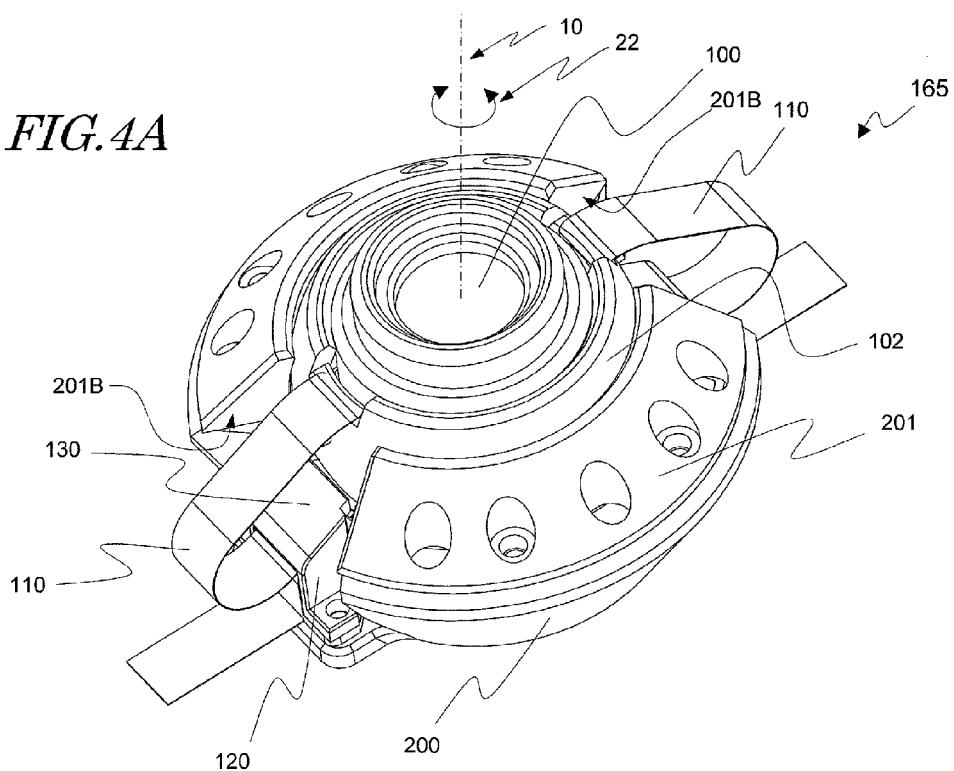
FIG. 4A is a perspective view in which the first embodiment of the present invention is viewed from above from another angle.
Figure 4B:
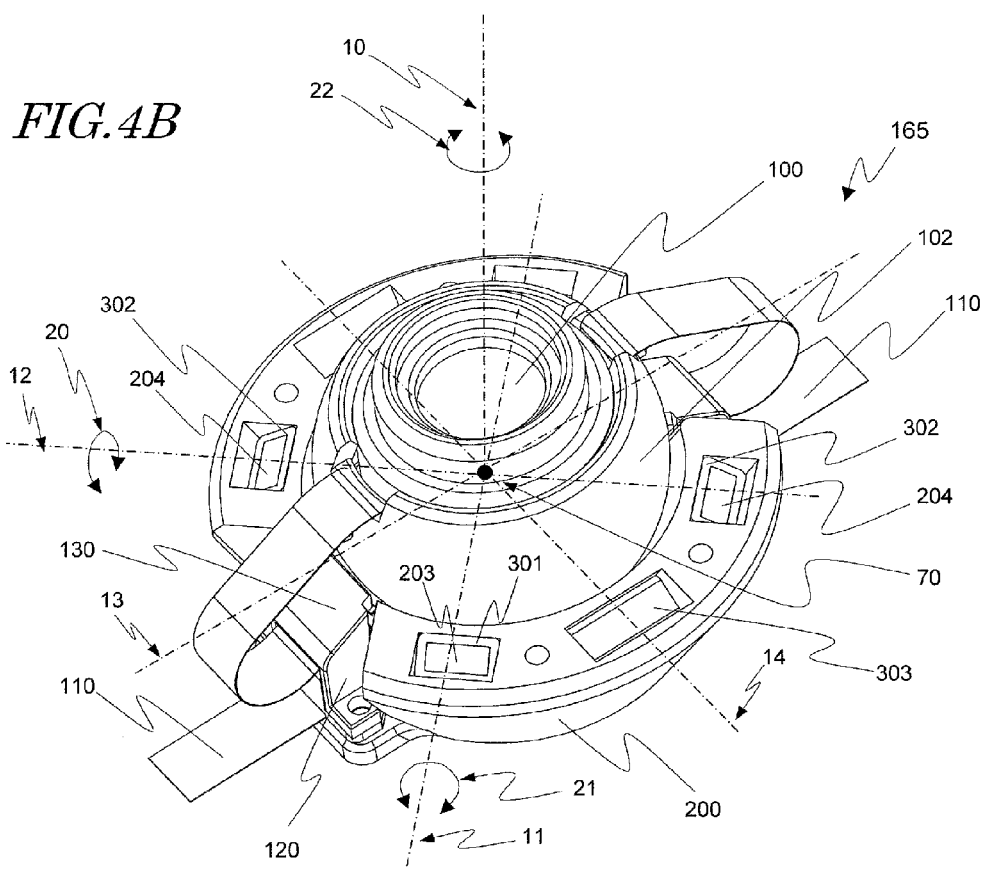
FIG. 4B is a perspective view in which the first embodiment of the present invention is viewed from above from the another angle and the drop-off preventing members 201 are omitted.
Figure 4C:
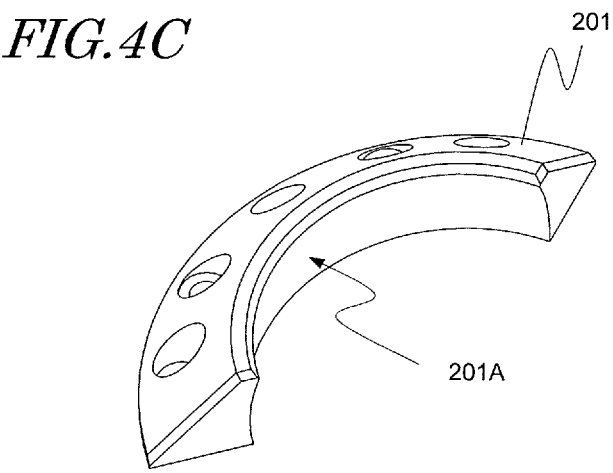
FIG. 4C is a perspective view in which the drop-off preventing member 201 of the first embodiment of the present invention is viewed from above.
Figure 5:
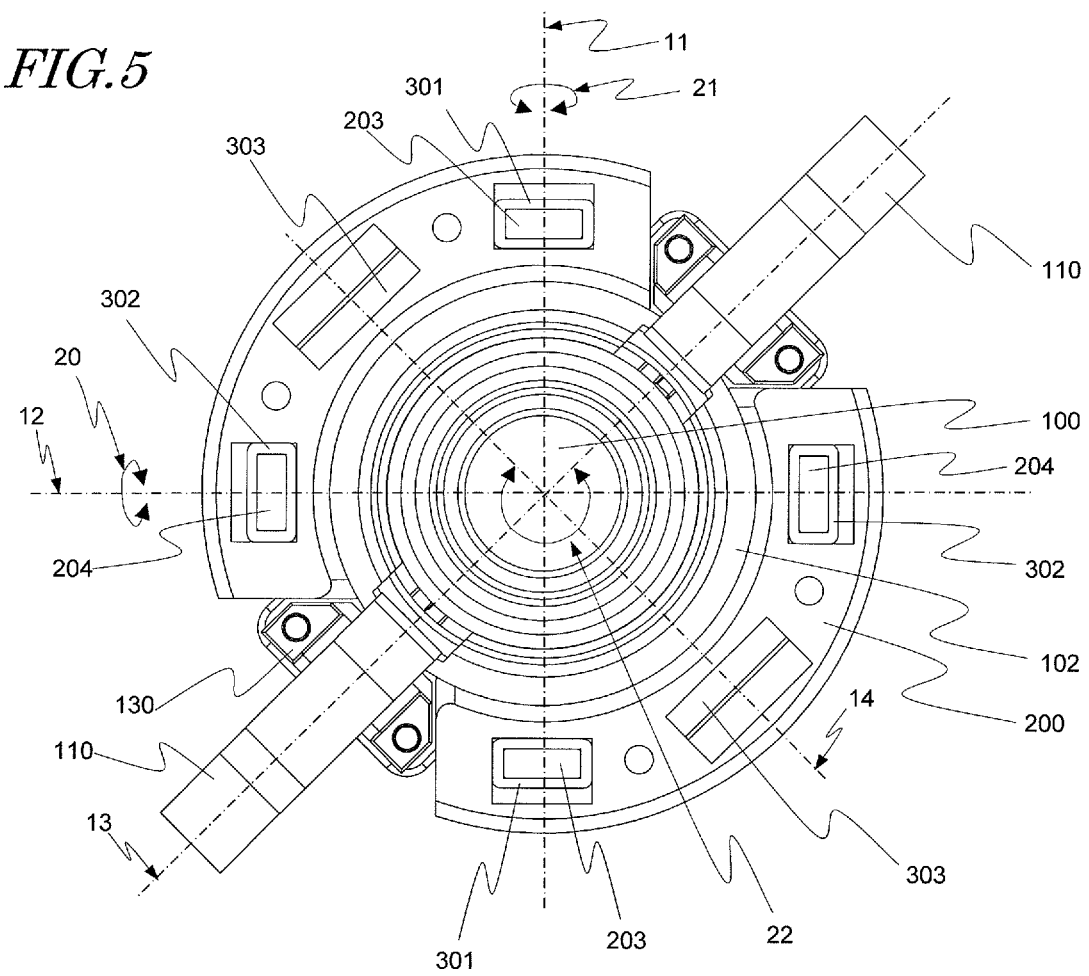
FIG. 5 is a plan view in which the first embodiment of the present invention is viewed from a direction of an optical axis 10 of a lens to be mounted to a camera portion 100.
Figure 6A:
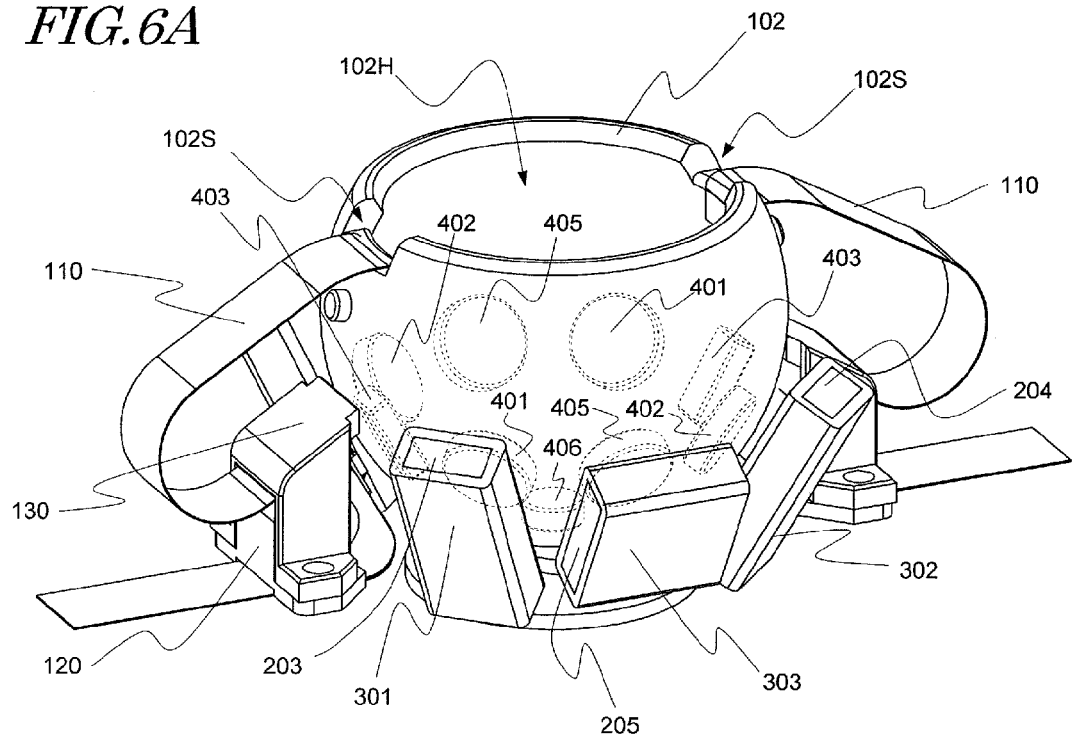
FIG. 6A is a perspective view in which the first embodiment of the present invention is viewed from above and the camera portion 100 and a base 200 are omitted from a movable unit and a drive portion.
Figure 6B:
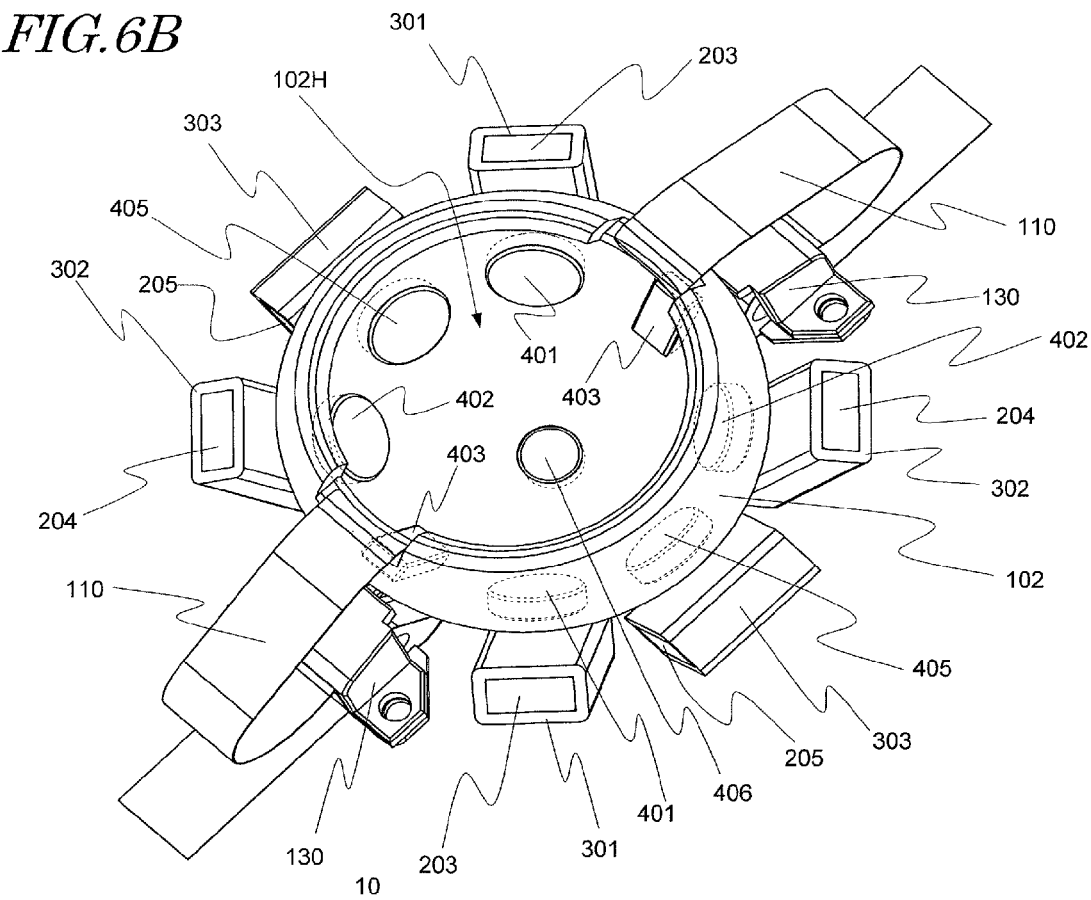
FIG. 6B is a perspective view in which the first embodiment of the present invention is viewed from above from another angle and the camera portion 100 and the base 200 are omitted from the movable unit and the drive portion.
Figure 7:
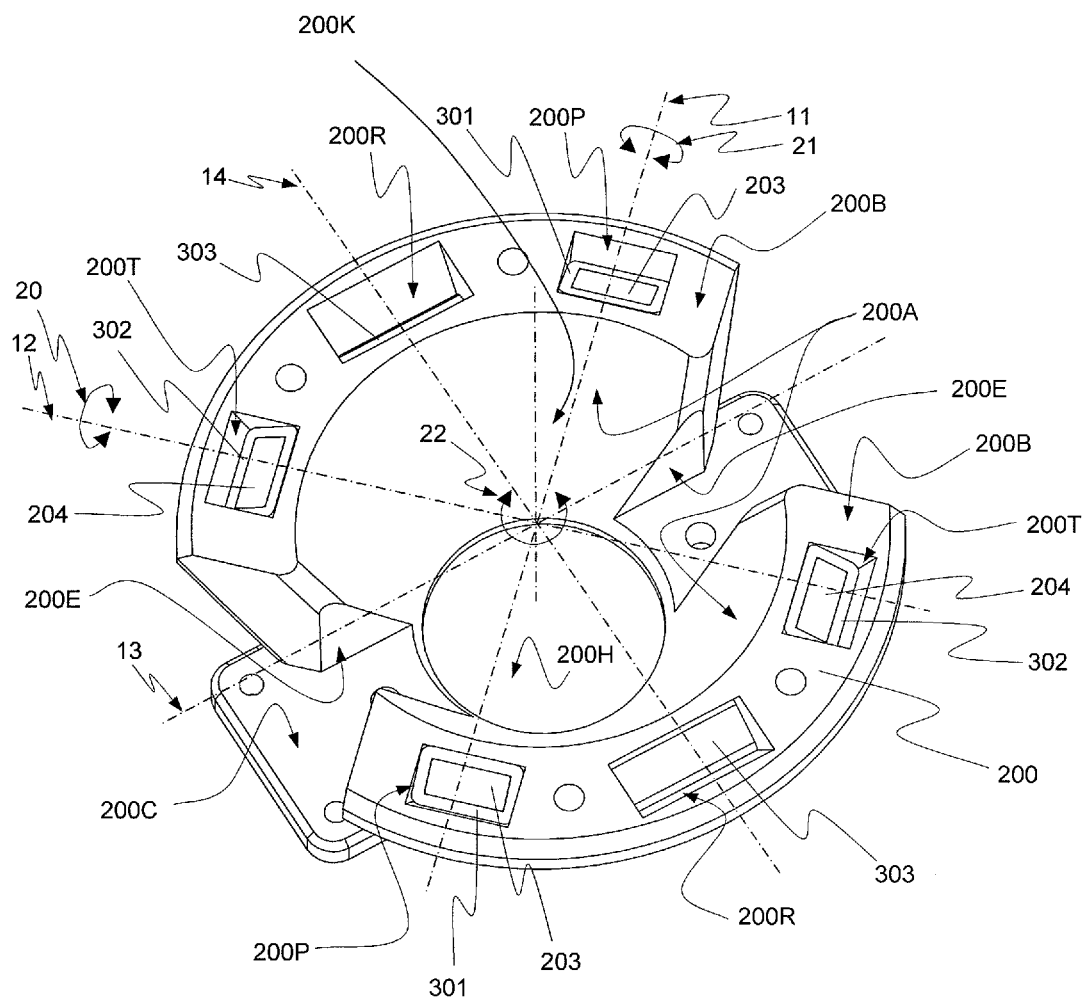
FIG. 7 is a perspective view in which a fixing unit of the first embodiment of the present invention is viewed from above.
Figure 8:
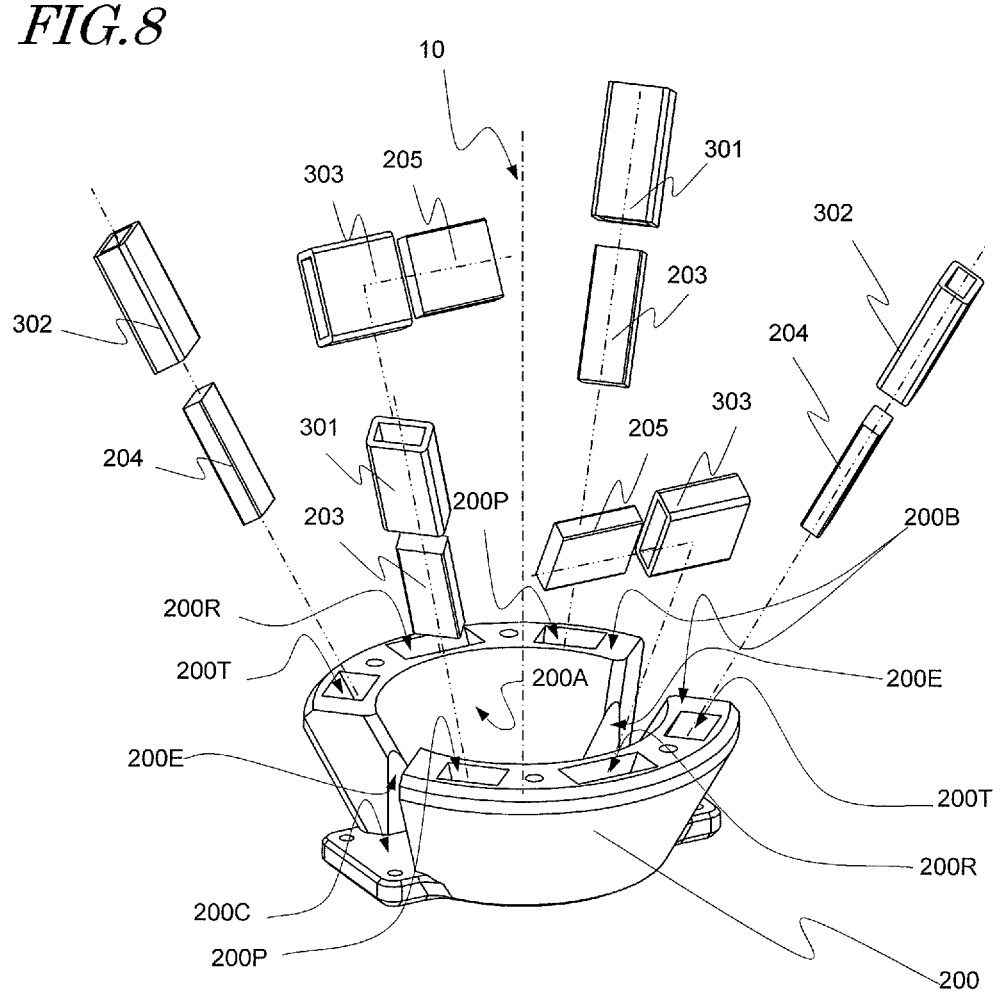
FIG. 8 is an exploded perspective view illustrating a schematic structure of the fixing unit of the first embodiment of the present invention.
Figure 12A:
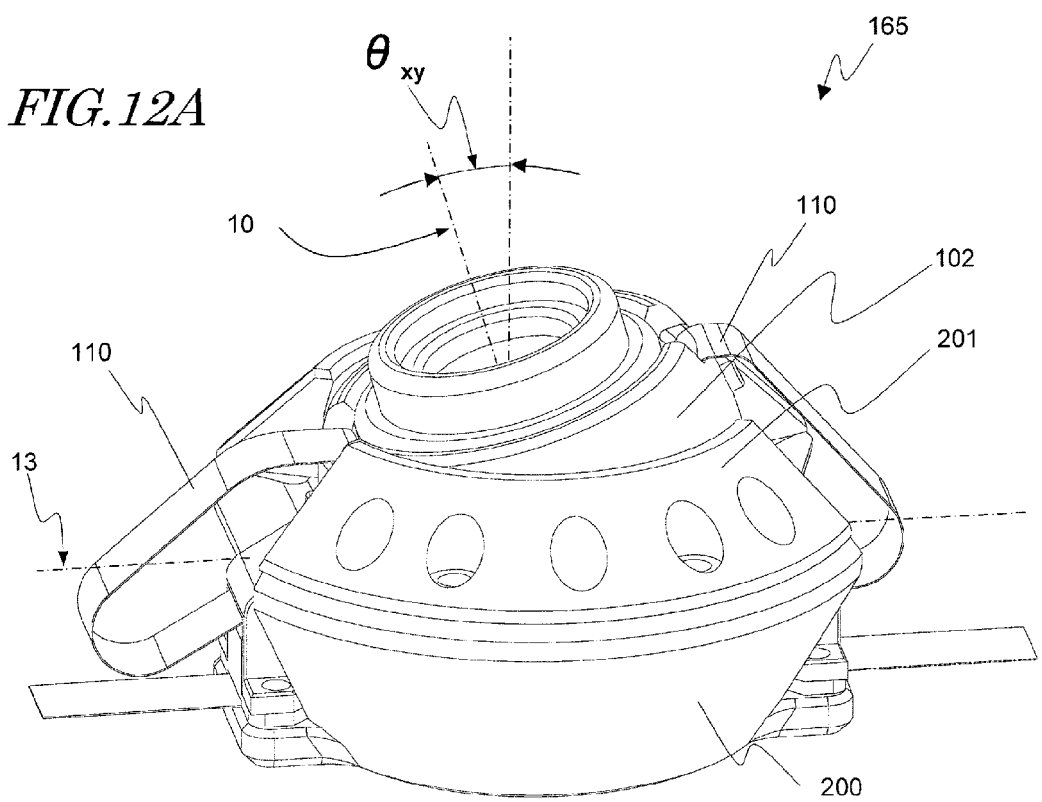
FIG. 12A is a perspective view viewed from above, illustrating a state in which the movable unit of the first embodiment of the present invention is tilted at the same angle in each of a panning direction 20 and a tilting direction 21, that is, tilted at a resultant angle $\theta_{xy}$.
Figure 12B:
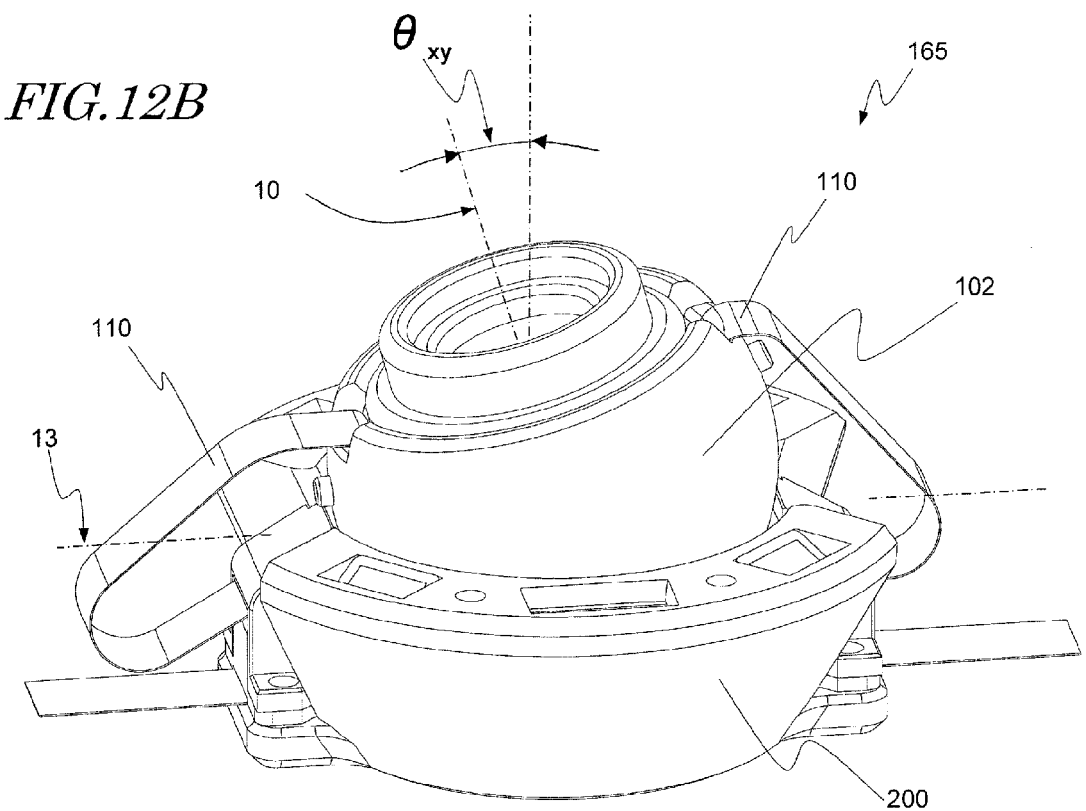
FIG. 12B is a perspective view viewed from above, illustrating a state in which the movable unit of the first embodiment of the present invention is tilted at the same angle in each of the panning direction 20 and the tilting direction 21, that is, tilted at the resultant angle $\theta_{xy}$ and in which the drop-off preventing members 201 are omitted.
Figure 14A:
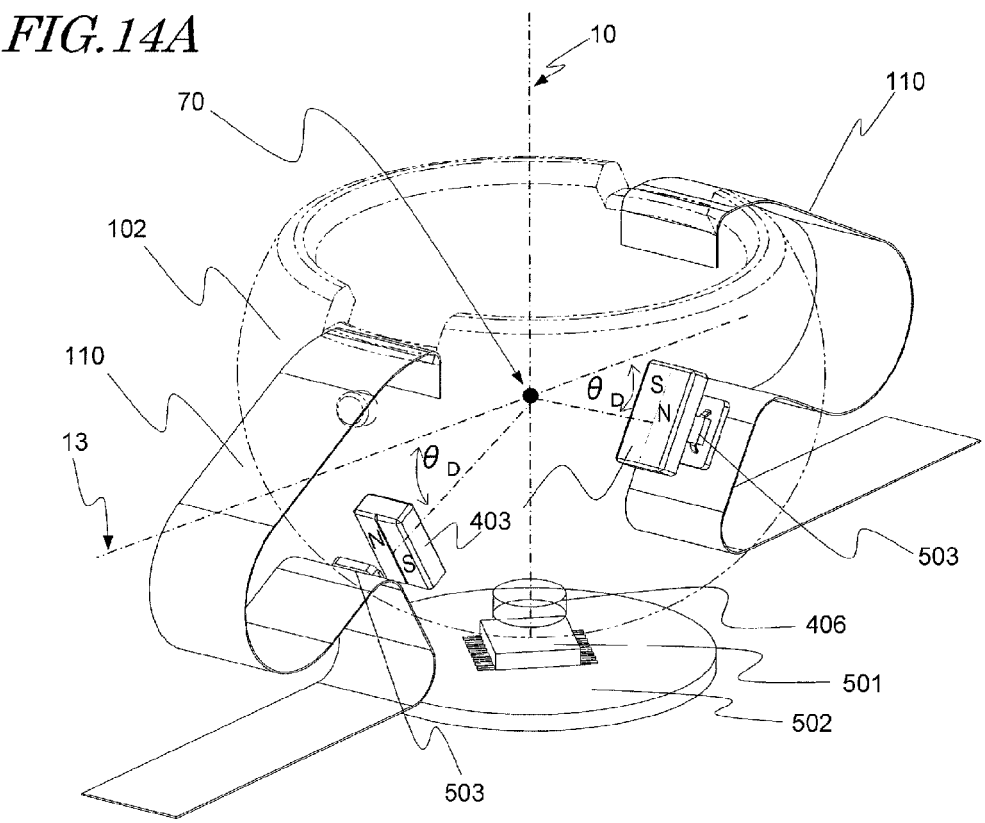
FIG. 14A is a perspective view in which a tilt detector and rotation detectors of the first embodiment of the present invention are viewed from above.
Figure 14B:
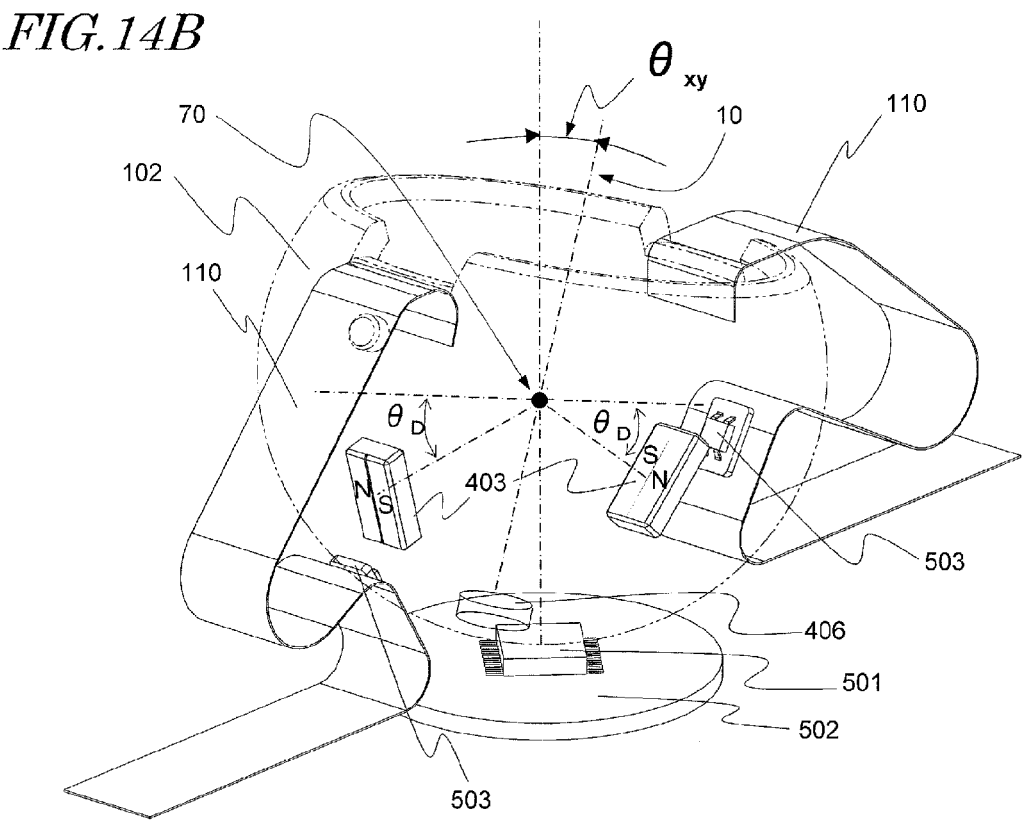
FIG. 14B is a perspective view viewed from above, illustrating a state in which the tilt detector and the rotation detectors of the first embodiment of the present invention are tilted at the same angle in each of the panning direction 20 and the tilting direction 21, that is, tilted at the resultant angle $\theta_{xy}$.

FIGS. 1 and 2 are each an exploded perspective view of a camera driving apparatus 165 according to the first embodiment of the present invention. FIGS. 3A and 4A are each a perspective view in which the camera driving apparatus 165 is viewed from obliquely above. FIGS. 3B and 4B are each a perspective view in which the camera driving apparatus 165, from which some components (camera portion 100 and drop-off preventing members 201) are removed, is viewed from obliquely above. FIG. 5 is a plan view in which the camera driving apparatus 165 is viewed from a direction of an optical axis 10 of a lens to be mounted to the camera portion 100. FIGS. 6A and 6B are each a perspective view in which a movable unit and a drive portion, from which the camera portion 100 and a base 200 are removed, are viewed from above. FIG. 7 is a perspective view of a fixing unit viewed from above. FIG. 8 is an exploded perspective view illustrating a schematic structure of the fixing unit. FIG. 9(a) is a top view of the camera driving apparatus 165, and FIG. 9(b) is a sectional view taken along a plane including the optical axis 10 and a panning direction rotation axis 12. FIG. 10(a) is a top view of the camera driving apparatus 165, and FIG. 10(b) is a sectional view taken along a plane including the optical axis 10 and a straight line 14. FIG. 11(a) is a top view of the camera driving apparatus 165, and FIG. 11(b) is a sectional view taken along a plane including the optical axis 10 and a straight line 13. FIG. 12A is a perspective view viewed from above, illustrating a state in which the movable unit is tilted at the same angle in each of a panning direction 20 and a tilting direction 21, that is, tilted at a resultant angle $\theta_{xy}$. FIG. 12B is a perspective view viewed from above, illustrating a state in which the movable unit is tilted at the same angle in each of the panning direction 20 and the tilting direction 21, that is, tilted at the resultant angle $\theta_{xy}$ and in which the drop-off preventing members 201 are omitted. FIG. 13(a) is a top view of the camera driving apparatus 165, and FIG. 13(b) is a sectional view taken along the plane including the optical axis 10 and the straight line 13 under the state in which the movable unit is tilted at the same angle in each of the panning direction 20 and the tilting direction 21, that is, tilted at the resultant angle $\theta_{xy}$. FIG. 14A is a perspective view in which a tilt detector and rotation detectors are viewed from above. FIG. 14B is a perspective view viewed from above, illustrating a state in which the tilt detector and the rotation detectors are tilted at the same angle in each of the panning direction 20 and the tilting direction 21, that is, tilted at the resultant angle $\theta_{xy}$. With reference to those figures, description is made of a main configuration of the camera driving apparatus 165.

The camera driving apparatus 165 includes the camera portion 100, the movable unit incorporating the camera portion 100, and the fixing unit for supporting the movable unit. With respect to the fixing unit, the movable unit is freely rotated in a rolling direction 22 in which the movable unit is rotated about the optical axis 10 of the lens, the tilting direction 21 in which the movable unit is rotated about the tilting direction rotation axis 11, and the panning direction 20 in which the movable unit is rotated about the panning direction rotation axis 12. The tilting direction rotation axis 11 and the panning direction rotation axis 12 are orthogonal to each other.

For the purpose of rotation in those directions, the camera driving apparatus 165 includes a first drive portion for tilting the movable unit in the panning direction 20 and the tilting direction 21, and a second drive portion corresponding to a rolling drive portion for rotating the camera portion 100 in the rolling direction 22 in which the camera portion is rotated about the optical axis 10 of the lens with respect to the fixing unit.

The first drive portion includes a panning drive portion and a tilting drive portion. The panning drive portion includes a pair of panning drive magnets 401, a pair of panning drive coils 301, and a pair of panning magnetic yokes 203, which are described above. The tilting drive portion includes a pair of tilting drive magnets 402, a pair of tilting drive coils 302, and a pair of tilting magnetic yokes 204. The rolling drive portion includes a pair of rolling drive magnets 405, a pair of rolling drive coils 303, and a pair of rolling magnetic yokes 205. Detailed description of how the first drive portion and the second drive portion drive the movable unit is made below.

Further, the camera driving apparatus 165 includes a detector for detecting a tilt angle at which the movable unit provided with the camera portion 100 is tilted with respect to the fixing unit, and a rotation angle at which the movable unit is rotated about the optical axis 10 of the lens. Specifically, there are provided a first detection portion for detecting a two-dimensional tilt angle of the movable unit, in other words, rotation angles in the panning direction 20 and the tilting direction 21, and a second detection portion for detecting a tilt angle with respect to the optical axis 10 of the lens. The first detection portion includes a first magnetic sensor 501 and a tilt detecting magnet 406. The second detection portion includes a pair of second magnetic sensors 503 and a pair of rotation detecting magnets 403. Detailed description of the detector is made below.

As illustrated in FIGS. 1 and 2, the camera portion 100 includes an imaging element (not shown), a lens (not shown) for forming an object image on an imaging plane of the imaging element, the lens having the optical axis 10, and a lens barrel (not shown) for holding the lens. Wiring components 110 for outputting output signals from the camera portion 100 to an outside are connected to the camera portion 100. The wiring components 110 include flexible printed circuits (abbreviated as FPC, and also referred to as flexible printed circuit, flexible printed board, or flexible printed cable).

The fixing unit includes the base 200. The base 200 includes a concave portion 200K to which at least a part of the movable unit is loosely fitted. In this embodiment, an inner side surface of the concave portion 200K is formed of a concave conical surface 200A. The inner side surface of the concave portion 200K may have another shape as long as the concave portion 200K is held in point or linear contact with the movable unit. For example, a triangular pyramid shape may be employed. It is preferred that the concave conical surface 200A be made of a plastic resin material excellent in slidability. The base 200 is further provided with opening portions 200P, 200T, and 200R, contact surfaces 200B and 200C, and rotation regulating surfaces 200E.

As illustrated in FIGS. 7 and 8, the pair of panning drive coils 301 wound respectively around the pair of panning magnetic yokes 203, the pair of tilting drive coils 302 wound respectively around the pair of tilting magnetic yokes 204, and the pair of rolling drive coils 303 wound respectively around the pair of rolling magnetic yokes 205 are respectively inserted into the opening portions 200P, 200T, and 200R, and fixed therein.

It is preferred that the fixing unit including the base 200 be made of a resin. It is more preferred that the fixing unit including the base 200 be molded integrally with the panning drive coils 301 wound around the pair of panning magnetic yokes 203, the tilting drive coils 302 wound around the pair of tilting magnetic yokes 204, and the rolling drive coils 303 wound around the pair of rolling magnetic yokes 205. Further, it is preferred that the drive coils wound around the magnetic yokes not be exposed on the inner side surface of the base 200, in other words, on the concave conical surface 200A.

Figure 9:
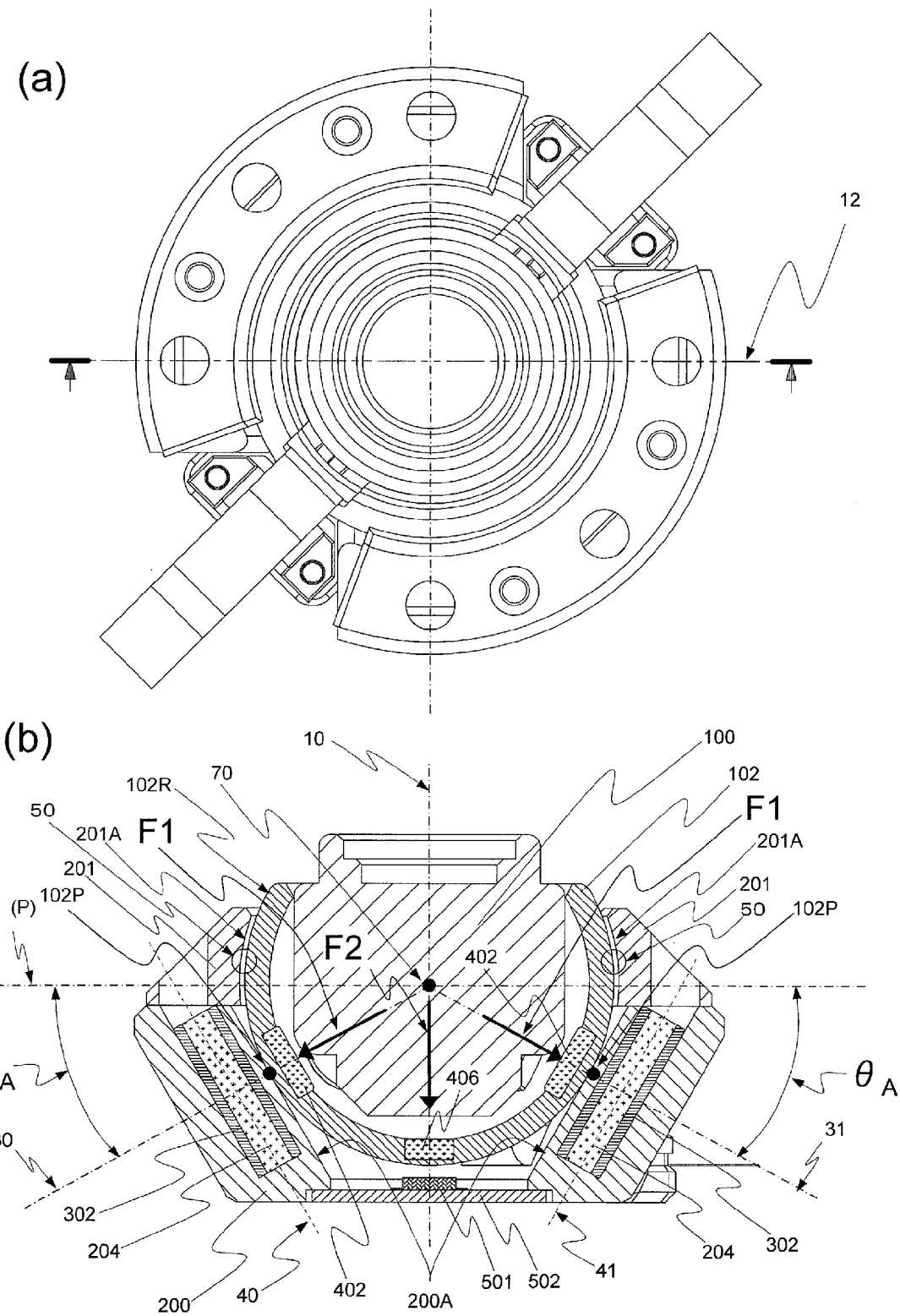
FIG. 9 illustrates, in parts (a) and (b), a top view of the first embodiment of the present invention and a sectional view taken along a plane including the optical axis 10 and a panning direction rotation axis 12, respectively.

The movable unit includes a movable portion 102. The movable portion 102 is capable of incorporating the camera portion 100, and has a bowl shape having an opening portion 102H. An outer shape of the movable portion 102 is formed as a convex partial spherical surface 102R. The convex partial spherical surface 102R may be at least a part of a spherical surface, or the entirety of the spherical surface. The convex partial spherical surface 102R has a spherical center 70. As illustrated in FIGS. 9, 10, and 11, the convex partial spherical surface 102R of the movable portion 102 is held in linear contact with the concave conical surface 200A of the fixing unit.

The convex partial spherical surface 102R covers the entirety of an outer side of the movable portion 102. More specifically, the movable portion 102 has a shape of a partially cut-out sphere, and a surface of the rest of the cut-out sphere forms the convex partial spherical surface 102R. The camera portion 100 is provided in the movable portion 102 and is inserted from a circular cross-section formed by partially cutting out the sphere toward an inside of the sphere. Thus, the spherical center 70 of the convex partial spherical surface 102R is positioned substantially at a center of the movable portion 102, in other words, positioned inside the camera portion 100. As illustrated in FIG. 2, rotation regulating protruding portions 102T may be provided on the convex partial spherical surface 102R. Further, in order to position the wiring components 110 connected to the camera portion 100 in the movable unit, the movable portion 102 may be provided with cutout portions 102S having recessed portions into which the wiring components 110 are partially inserted.

The movable unit is provided with the tilt detecting magnet 406, the pair of rotation detecting magnets 403, the pair of panning drive magnets 401, the pair of tilting drive magnets 402, and the pair of rolling drive magnets 405. It is preferred that the detecting magnets and the drive magnets to be mounted be arranged from the opening portion 102H onto the inner side of the movable portion 102 so as not to be exposed on the convex partial spherical surface 102R. Further, the tilt detecting magnet 406 is arranged on a bottom portion of the movable portion 102 and on the optical axis 10. It is preferred that the movable portion 102 be made of a resin excellent in slidability. It is more preferred that the movable portion 102, the tilt detecting magnet 406, the pair of rotation detecting magnets 403, the pair of panning drive magnets 401, the pair of tilting drive magnets 402, and the pair of rolling drive magnets 405 be molded integrally with each other.

As illustrated in FIGS. 9 and 10, each of the panning magnetic yokes 203, the tilting magnetic yokes 204, and the rolling magnetic yokes 205, which are provided inside the base 200, is formed of a magnetic body. Thus, each of the panning drive magnets 401, the tilting drive magnets 402, and the rolling drive magnets 405, which are provided on the inner side of the movable portion 102 so as to respectively face the panning magnetic yokes 203, the tilting magnetic yokes 204, and the rolling magnetic yokes 205, functions as an attracting magnet, and a magnetic attraction force is generated between each of the pairs of the magnets and the yokes. Specifically, a magnetic attraction force F1 is generated from the panning magnetic yokes 203 and the panning drive magnets 401, a magnetic attraction force F1 is generated from the tilting magnetic yokes 204 and the tilting drive magnets 402, and a magnetic attraction force F3 is generated from the rolling magnetic yokes 205 and the rolling drive magnets 405.

Thus, each of the magnetic attraction forces F1 and F3 acts as a normal force between the convex partial spherical surface 102R of the movable unit and the concave conical surface 200A of the fixing unit held in contact with each other. In addition, magnetic attraction forces F2 and F4 are obtained as resultant vectors in a direction of the optical axis 10.

Those magnetic attraction forces F2 and F4 cause the movable portion 102 to be freely rotated about the spherical center 70, while the concave conical surface 200A of the base 200 and the partial spherical surface of the convex partial spherical surface 102R of the movable portion 102 are held in linear contact with each other at contact points 102P. In other words, the movable unit is supported by the fixing unit under a linear contact state in which a trace of each of the contact points 102P circumferentially continues about the optical axis 10.

With those configurations for supporting the movable unit, the movable unit can be rotated in the tilting directions of the following two types: the panning direction 20 in which the movable unit is rotated about the panning direction rotation axis 12 which is orthogonal to the optical axis 10 and passes through the spherical center 70; and the tilting direction 21 in which the movable unit is rotated about the tilting direction rotation axis 11 which is orthogonal to the optical axis 10 and the panning direction rotation axis 12. In addition, the movable unit can be rotated in the rolling direction 22 in which the movable unit is rotated about the optical axis 10 of the lens.

In particular, the movable portion 102 has the shape of a partially cut-out sphere, and hence the spherical center 70 coincides with a center of the movable portion 102 and a center of gravity of the movable portion 102. Thus, the movable unit is rotatable in any of the panning direction 20, the tilting direction 21, and the rolling direction 22 with substantially the same moment. As a result, regardless of how the movable unit has been rotated in the panning direction 20, the tilting direction 21, or the rolling direction 22, the movable unit can be further rotated in any of the panning direction 20, the tilting direction 21, and the rolling direction 22 by a substantially equal drive force at any time. Thus, the movable unit can be driven with high accuracy at any time.

Further, the spherical center 70, in other words, a rotation center of the movable unit and the center of gravity of the movable unit coincide with each other. Thus, moments with which the movable unit is rotated in the panning direction 20, the tilting direction 21, and the rolling direction 22 are markedly small. Therefore, with a small drive force, the movable unit can be maintained in a neutral state, and rotated in the panning direction 20, the tilting direction 21, and the rolling direction 22. With this, power consumption of the camera driving apparatus can be saved. In particular, a drive current necessary for maintaining the movable unit in the neutral state can be reduced to substantially zero.

As described above, according to this embodiment, the movable unit incorporating the camera portion 100 is intensively supported at the spherical center 70 at which the center of gravity exists. Thus, frictional load can be reduced, and mechanical resonance can be markedly suppressed in a drive frequency range.

Further, without influence of the rolling angles, the panning drive magnets 401, the tilting drive magnets 402, and the rolling drive magnets 405 add, through a certain magnetic attraction force, a certain normal force to contact points between the concave conical surface 200A and the convex partial spherical surface 102R in a spreading manner. Thus, frictional load variation in accordance with the rolling angles can be suppressed, and satisfactory phase-and-gain characteristics can be obtained in the drive frequency range.

Further, when each of the base 200 having the concave conical surface 200A and the movable portion 102 having the convex partial spherical surface 102R is made of a resin material such as plastic, friction between the concave conical surface 200A and the convex partial spherical surface 102R to be held in contact with each other can be further reduced. As a result, a support structure excellent in abrasion resistance can be provided.

It is preferred that the camera driving apparatus 165 include the drop-off preventing members 201 for restricting movement of the movable unit so as to prevent the movable unit from dropping off from the fixing unit. The drop-off preventing members 201 respectively have drop-off preventing regulating surfaces 201A. Thus, when the movable unit moves away from the fixing unit, the movable portion 102 of the movable unit and the drop-off preventing regulating surfaces 201A abut against each other and restrict the movement of the movable unit. As illustrated in FIGS. 9 and 10, predetermined gaps 50 are provided between the convex partial spherical surface 102R of the movable portion 102 and the drop-off preventing regulating surfaces 201A of the drop-off preventing members 201 so that the movable portion 102 can be freely rolled with respect to the spherical center 70 within the entire movable range.

It is preferred that each of the drop-off preventing regulating surfaces 201A have a concave partial spherical surface having a center which coincides with the spherical center 70 of the convex partial spherical surface 102R of the movable portion 102. The drop-off preventing members 201 are fixed to the contact surfaces 200B of the base 200. Between the convex partial spherical surface 102R and the drop-off preventing regulating surfaces 201A, the gaps 50 are formed under a state in which the convex partial spherical surface 102R of the movable portion 102 is held in contact at the contact points 102P with the concave conical surface 200A of the fixing unit. Further, the drop-off preventing regulating surfaces 201A are arranged symmetrically with respect to the optical axis 10 of the lens. Note that, "symmetry with respect to the optical axis 10" of the components provided to the fixing unit is defined with reference to the optical axis 10 under the neutral state of the movable unit, in other words, under a state in which the movable unit is not tilted with respect to the fixing unit.

Each of the gaps 50 is set to have such a clearance that, even when the convex partial spherical surface 102R of the movable portion 102 is spaced apart from the concave conical surface 200A, the convex partial spherical surface 102R can restore a state in which the convex partial spherical surface 102R is held in contact at the contact points 102P with the concave conical surface 200A by the magnetic attraction forces F1 and F3.

In other words, even under a state in which the drop-off preventing regulating surfaces 201A and the convex partial spherical surface 102R are held in contact with each other as a result of upward movement of the movable unit by a distance equal to the clearances of the gaps 50, through the magnetic attraction forces F1 and F3, the movable unit can restore the original state in which the convex partial spherical surface 102R is held in contact with the concave conical surface 200A.

Thus, according to this embodiment, it is possible to provide a camera driving apparatus excellent in impact resistance. Specifically, even when the movable unit instantaneously drops off from a predetermined position, the movable unit can immediately restore the original, satisfactorily supported state through the magnetic attraction forces F1 and F3.

Next, detailed description is made of a structure for driving the movable unit.

In the movable portion 102, the pair of panning drive magnets 401 are arranged symmetrically with respect to the optical axis 10 for the purpose of driving the movable unit to be rotated in the panning direction 20, and the pair of tilting drive magnets 402 are arranged symmetrically with respect to the optical axis 10 for the purpose of driving the movable unit to be rotated in the tilting direction 21. Further, the pair of rolling drive magnets 405 are arranged symmetrically with respect to the optical axis 10 for the purpose of driving the movable unit to be rotated in the rolling direction 22.

Each of the panning drive magnets 401 is magnetized to have one pole so as to generate a magnetic flux in a direction of the tilting direction rotation axis 11. Similarly, each of the tilting drive magnets 402 is magnetized to have one pole so as to generate a magnetic flux in a direction of the panning direction rotation axis 12.

As described above, the pair of panning magnetic yokes 203 and the pair of tilting magnetic yokes 204 are provided on a circumference of the base 200 around the optical axis 10 so as to respectively face the pair of panning drive magnets 401 and the pair of tilting drive magnets 402.

As illustrated in FIGS. 5 to 8, the pair of panning magnetic yokes 203 arranged in the direction of the tilting direction rotation axis 11 in the base 200 are respectively provided with the panning drive coils 301 wound around the panning magnetic yokes 203. Similarly, the pair of tilting magnetic yokes 204 arranged in the direction of the panning direction rotation axis 12 orthogonal to the tilting direction rotation axis 11 are respectively provided with the tilting drive coils 302 wound around the tilting magnetic yokes 204. Further, on the straight line 14 which forms an angle of 45 degrees with respect to each of the tilting direction rotation axis 11 and the panning direction rotation axis 12, the pair of rolling magnetic yokes 205 are arranged in the base 200 symmetrically with respect to the optical axis 10. The rolling drive coils 303 are respectively wound around the rolling magnetic yokes 205.

In other words, the respective drive portions in the panning direction 20, the tilting direction 21, and the rolling direction 22 are arranged independently of and separately from each other on the circumference around the optical axis 10.

With such a structure, magnetic gaps between the panning magnetic yokes 203 and the panning drive magnets 401, magnetic gaps between the tilting magnetic yokes 204 and the tilting drive magnets 402, and magnetic gaps between the rolling magnetic yokes 205 and the rolling drive magnets 405 can be uniformly provided. Thus, respective magnetic flux densities of the magnetic gaps can be uniformly increased. As a result, drive efficiencies in the panning direction 20, the tilting direction 21, and the rolling direction 22 are markedly improved.

Next, description is made of vertical arrangement of a tilting drive portion and a rotational drive portion in the direction of the optical axis 10.

As illustrated in FIG. 9, straight lines 30 and 31 each form a tilt angle $\theta_A$ of 45 degrees or less downward with respect to a horizontal plane P which is perpendicular to the optical axis 10 and includes the spherical center. The straight lines 30 and 31 are respectively perpendicular to winding central axes 40 and 41 of the tilting drive coils 302 wound around the tilting magnetic yokes 204 fixed to the base 200, and pass through the spherical center 70 and centers of the tilting drive coils 302. Further, the pair of tilting drive magnets 402 are arranged in the movable unit in a tilted manner so as to respectively face the pair of tilting drive coils 302.

Although not shown, there are defined other straight lines, each of which also forms the tilt angle $\theta_A$ of 45 degrees or less downward with respect to the horizontal plane P which is perpendicular to the optical axis 10 and includes the spherical center. The other straight lines are respectively perpendicular to winding central axes of the panning drive coils 301 wound around the panning magnetic yokes 203 fixed to the base 200, and pass through the spherical center 70 and centers of the panning drive coils 301. Further, the pair of panning drive magnets 401 are also arranged in the movable unit in a tilted manner so as to respectively face the pair of panning drive coils 301.

Further, as illustrated in FIG. 10, straight lines 32 and 33 each form a tilt angle $\theta_B$ of 45 degrees or less downward with respect to the horizontal plane P which is perpendicular to the optical axis 10 and includes the spherical center. The straight lines 32 and 33 are respectively perpendicular to respective winding central axes 42 and 43 of the rolling drive coil 303 and the rolling drive coil 303 wound around the rolling magnetic yokes 205 fixed to the base 200, and pass through the spherical center 70 and centers of the rolling drive coils 303. The pair of rolling drive magnets 405 are arranged in the movable unit in a tilted manner so as to respectively face the pair of rolling drive coils 303.

Still further, as illustrated in FIG. 9, the winding central axes 40 and 41 serve as center lines of the pair of opening portions 200T for inserting the tilting magnetic yokes 204 and the tilting drive coils 302 illustrated in FIGS. 7 and 8 into the base 200. Although not shown, similarly, center lines of the pair of opening portions 200P for inserting the panning magnetic yokes 203 and the panning drive coils 301 coincide with the winding central axes of the panning drive coils 301.

Further, as illustrated in FIG. 10, in the plane including the straight line 14 which forms an angle of 45 degrees with respect to each of the panning direction rotation axis 12 and the tilting direction rotation axis 11 and including the optical axis 10, a straight line 47 orthogonal to the winding central axis 43 of the one of the rolling drive coils 303 and to the straight line 32, and a straight line 48 orthogonal to the winding central axis 42 of the another of the rolling drive coils 303 and to the straight line 33 serve as center lines of the pair of opening portions 200R for inserting the rolling magnetic yokes 205 and the rolling drive coils 303 illustrated in FIGS. 7 and 8.

As described above, through the setting of the tilt angles $\theta_A$ and $\theta_B$ to be 45 degrees or less, a height of the fixing unit can be reduced, with the result that space saving and height reduction of the device can be achieved. It is preferred that the tilt angles $\theta_A$ and $\theta_B$ be approximately 20 degrees.

When the pair of panning drive coils 301 are energized, the pair of panning drive magnets 401 receive a couple of electromagnetic forces, with the result that the movable portion 102, in other words, the movable unit is driven to be rotated in the panning direction 20 about the panning direction rotation axis 12. Similarly, when the pair of tilting drive coils 302 are energized, the pair of tilting drive magnets 402 receive a couple of electromagnetic forces, with the result that the movable unit is driven to be rotated in the tilting direction 21 about the tilting direction rotation axis 11.

Further, when the panning drive coils 301 and the tilting drive coils 302 are simultaneously energized, the movable unit provided with the camera portion 100 can be two-dimensionally tilted. FIGS. 12A, 12B, and 13 illustrate a state in which, through the simultaneous energization of the panning drive coils 301 and the tilting drive coils 302 with an equivalent electric current, the movable unit is tilted at the same angle in each of the panning direction 20 and the tilting direction 21, with the result that the movable unit is tilted at the resultant angle $\theta_{xy}$ in a direction of the straight line 13 which forms an angle of 45 degrees with respect to each of the panning direction 20 and the tilting direction 21.

Further, when the rolling drive coils 303 are energized, the pair of rolling drive magnets 405 receive a couple of electromagnetic forces, with the result that the movable unit is driven to be rotated in the rolling direction 22 about the optical axis 10.

As described above, in this embodiment, there is employed a moving magnet drive method in which the movable unit is provided with the panning drive magnets 401, the tilting drive magnets 402, and the rolling drive magnets 405. It can be conceived that, in general, this structure has a problem of an increase in weight of the movable unit. However, with this structure, it is unnecessary to suspend drive wiring components to the movable unit, and it suffices that drive signals to the camera portion 100 and the output signals from the camera portion 100 be transmitted between the movable unit and the outside. Further, the center of gravity of the movable unit and a rolling center of the movable unit coincide with each other. Thus, even when the weight of the movable unit increases by the drive magnets mounted thereto, a rotational moment of the movable unit does not markedly increase. Thus, according to this embodiment, advantages of the moving magnet drive method can be utilized while overcoming problems with the increase in weight.

Next, description is made of transmission means for the drive signals to the camera portion 100 and the output signals from the camera portion 100.

As illustrated in FIGS. 6A, 6B, 11, and 13, the pair of wiring components 110 arranged symmetrically in the direction of the straight line 13 which forms an angle of 45 degrees with respect to each of the panning direction 20 and the tilting direction 21 about the optical axis 10 are provided as the transmission means.

Specifically, as illustrated in FIGS. 1 and 2, there are fixed first fixing holders 120 for sandwiching and positioning the wiring components 110 with respect to the contact surfaces 200c of the base 200. Further, as illustrated in FIGS. 11 and 13, tilted surfaces 120A (refer to FIGS. 1 and 2) of the first fixing holders 120 are tilted to be parallel to straight lines 44 and 45 so as to form the same angle as those formed by the straight lines 44 and 45. The straight lines 44 and 45 are respectively orthogonal to straight lines 34 and 35 each tilted at a tilt angle $\theta_D$ downward with respect to the horizontal plane which is orthogonal to the optical axis 10 and includes the spherical center 70. It is preferred that the tilt angle $\theta_D$ be equal to the tilt angles $\theta_A$ and $\theta_B$.

A rear surface of each of the wiring components 110 is fixed to the tilted surface 120A by adhesive or the like. It is preferred that, as described below, the camera driving apparatus include the second magnetic sensors 503, and that the second magnetic sensors 503 be respectively arranged on surfaces of the wiring components 110 on the tilted surfaces 120A. With this, the second magnetic sensors 503 are fixed at an angle parallel to the straight lines 44 and 45.

The rotation detecting magnets 403 provided to the movable portion 102 are arranged at predetermined gaps with respect to the second magnetic sensors 503 so as to be parallel to and face the second magnetic sensors 503 fixed to the tilted surfaces 120A.

Through fixing of second fixing holders 130 to the contact surfaces 200C of the base 200, the wiring components 110 are sandwiched between tilted surfaces 120B (refer to FIGS. 1 and 2) of the first fixing holders 120 and the second fixing holders 130. In this way, the wiring components 110 are positioned.

With this, the wiring components 110 are bent downward along the tilt angle $\theta_D$. As a result, as illustrated in FIG. 13, each of the wiring components 110 can be bent so as to form a gentle curve even under a state in which the movable unit is tilted at the resultant angle $\theta_{xy}$. As a result, counteraction caused by bent-spring characteristics of the wiring components 110 with respect to the movable portion 102 can be reduced.

Further, as illustrated in FIG. 13, the second fixing holders 130 are fixed to the base 200 so as to be out of contact with the convex partial spherical surface 102R of the movable portion 102. However, when the movable unit is tilted at a target-specification tilt angle or larger, the pair of rotation regulating protruding portions 102T provided to the movable portion 102 come into contact with the second fixing holders 130 so that the movable unit is not tilted any more.

Note that, regulation of the angle at which the movable unit is rotated in the rolling direction 22 about the optical axis 10 is performed by bringing the pair of rotation regulating protruding portions 102T provided to the movable 102 into contact with the rotation regulating surfaces 200E (refer to FIG. 1) of the base 200 or rotation regulating surfaces 201B (refer to FIG. 1) of the drop-off preventing members 201.

Further, the moving magnet drive method is markedly advantageous in that heat generated by the panning drive coils 301, the tilting drive coils 302, and the rolling drive coils 303 can be cooled by the base 200 through intermediation of the panning magnetic yokes 203, the tilting magnetic yokes 204, and the rolling magnetic yokes 205. Still further, the moving magnet drive method is advantageous in that the movable unit can be downsized and reduced in weight in view of setting each of the tilt angles in the panning direction 20 and the tilting direction 21 and the rotation angle in the rolling direction 22 to 10 degrees or more. Meanwhile, a moving coil drive method has a risk that the drive coils are excessively large and hence a weight of the movable unit increases.

However, as described above, according to this embodiment, all the central axes of the following members pass through the spherical center 70 serving as a support center and drive center: the camera portion 100; the movable portion 102; the convex partial spherical surface 102R provided to the movable portion 102; the drop-off preventing regulating surfaces 201A; the concave conical surface 200A of the base 200; the tilting drive portion; the rotating drive portion; the tilt detecting magnet 406; and the rotation detecting magnets 403.

Thus, the center of gravity of the movable unit coincides with the spherical center 70, and hence the movable unit can be supported at the center of gravity. In addition, the movable unit can be driven to be rotated about the three axes which pass through the center of gravity and are orthogonal to each other. Further, the movable unit is prevented from dropping off.

The camera driving apparatus 165 may include a viscous member (not shown) for the purpose of reducing an amplitude increase coefficient (Q factor) of the movable unit. In this case, as illustrated in FIGS. 9 and 10, the viscous member is provided between the convex partial spherical surface 102R of the movable 102 and the drop-off preventing regulating surfaces 201A of the drop-off preventing members 201. With this, an amplitude increase coefficient (Q factor) of vibration caused by a magnetic spring effect derived from variation of the magnetic attraction force and a Q factor of an inherent mechanical vibration can be reduced, the variation of the magnetic attraction force being generated in accordance with tilt and rotation angles of the panning drive magnets 401, the tilting drive magnets 402, and the rolling drive magnets 405 provided to the movable unit, and the panning magnetic yokes 203, the tilting magnetic yokes 204, and the rolling magnetic yokes 205 provided to the base 200 with respect to each other. As a result, satisfactory control characteristics can be obtained.

Further, over the entire movable range of the movable unit, a convex-concave-shaped part (not shown) may be provided on a surface of a region free from the traces of the contact points 102P on the convex partial spherical surface 102R of the movable portion 102. The convex-concave shape contributes to enlargement of a contact area with respect to the viscous member. With this, viscous resistance can be increased, and viscous damping characteristics can be markedly enhanced.

Next, description is made of how the tilt and the rotation of the movable unit are detected. First, detailed description is made of how the tilt angles of the movable unit in the panning direction 20 and the tilting direction 21 of the movable unit are detected.

As illustrated in FIGS. 1, 2, 14A, and 14B, the camera driving apparatus 165 includes the first magnetic sensor 501 serving as the first detection portion for detecting the tilting angles of the movable unit. The first magnetic sensor 501 is capable of detecting tilt or rotation with respect to two axes, arranged to face the tilt detecting magnet 406 magnetized to have one pole in the direction of the optical axis 10, inserted into an opening portion 200H through intermediation of a circuit board 502, and fixed to the base 200.

Inside the first magnetic sensor 501, respectively on the tilting direction rotation axis 11 and the panning direction rotation axis 12, pairs of hall elements (not shown) are arranged symmetrically with respect to the optical axis 10. The first magnetic sensor 501 is capable of differentially detecting, as bi-axial components, magnetic-force variations of the tilt detecting magnet 406, which are caused by tilting operations of the movable unit in the panning direction 20 and the tilting direction 21, and calculating a panning tilt angle and a tilting tilt angle.

As described above, according to this embodiment, an interval between the tilt detecting magnet 406 and the spherical center 70 can be reduced, and hence movement of the tilt detecting magnet 406 with respect to the tilting angle can be reduced. Therefore, the first magnetic sensor 501 can be downsized.

Note that, in this embodiment, the first detection portion includes the first magnetic sensor 501 and the tilt detecting magnet 406, but the first detection portion may be formed of other components. For example, the first detection portion may include, on the optical axis 10, an optical sensor provided to the fixing unit and an optical detection pattern provided to the movable unit. When the optical detection pattern is tilted in accordance with the tilt of the movable unit, light entering the optical sensor varies. Through the detection of the light variation with the optical sensor, two-dimensional tilt angles in the panning direction and the tilting direction can also be calculated.

FIGS. 14A and 14B are each a perspective view illustrating an arrangement of the second magnetic sensors 503 serving as the second detection portion for detecting the rotation angle of the movable unit with respect to the optical axis 10. As described above, the second detection portion includes the pair of second magnetic sensors 503 and the pair of rotation detecting magnets 403. In the plane including the optical axis 10 and the straight line 13, which is orthogonal to the optical axis 10 and forms an angle of 45 degrees with respect to the tilting direction rotation axis 11 or the panning direction rotation axis 12, the pair of rotation detecting magnets 403 are arranged, symmetrically with respect to the optical axis 10, on the movable portion 102 so as to be positioned on the straight lines 34 and 35 each tilted downward at the tilt angle $\theta_D$.

In the plane orthogonal to the optical axis 10, the pair of rotation detecting magnets 403 are each magnetized to have two divided poles in a circumferential direction of a circle about the optical axis 10. Also in the plane orthogonal to the optical axis 10, the magnetic poles of the pair of rotation detecting magnets 403 are magnetized in a direction in which the magnetic poles pass through the spherical center 70, and arranged to be opposite in polarity to each other. Further, the two second magnetic sensors 503 are fixed to the tilted surfaces 120A of the first fixing holders 120 through intermediation of the wiring components 110 so that the two second magnetic sensors 503 face center boundaries of the two divided poles obtained by the magnetization of each of the pair of rotation detecting magnets 403.

When the movable unit is rotated in the rolling direction 22, the second magnetic sensors 503 differentially detect sudden changes in magnetic force caused by shift of the magnetic poles of the pair of rotation detecting magnets 403. With this, the rotation angle of the movable unit with respect to the optical axis 10 can be detected with high accuracy.

Further, as illustrated in FIG. 14B, when the movable portion 102 of the movable unit is tilted in the panning direction 20 and the tilting direction 21, a crosstalk output may be generated in the rolling direction 22. However, the crosstalk output can be cancelled with an output obtained by differential detection of magnetism of the pair of rotation detecting magnets 403, which is performed by the second magnetic sensors 503. Thus, it is possible to accurately extract and detect only the rotation angle in the rolling direction 22 within a range in which the movable unit can be tilted.

As described above, according to the camera driving apparatus in this embodiment, the spherical center of the convex partial spherical surface provided to the movable portion of the movable unit and the central axis of the concave conical surface of the fixing unit are arranged on the optical axis of the lens of the camera portion. With this, the movable unit can be supported at the center of gravity, and hence mechanical resonance can be markedly suppressed in the drive frequency range.

Further, in a pivotal structure formed of the concave conical surface of the fixing unit and the convex partial spherical surface of the movable unit, the magnetic attraction force that is less liable to be influenced by the rolling angles of the movable unit can be added as a certain normal force. Thus, frictional load variation in accordance with the rolling angles can be reduced, and satisfactory phase-and-gain characteristics can be obtained in the drive frequency range.

Still further, in order to prevent the movable unit from dropping off due to disturbance such as vibration and impact, which has conventionally been a serious problem peculiar to a support structure using the magnetic attraction force, the drop-off preventing members provided to the fixing unit are provided with the drop-off preventing regulating surfaces while securing the predetermined gaps which allow the movable unit to roll. Thus, the movable unit is reliably prevented from dropping off while avoiding an increase in size of the camera driving apparatus.

Yet further, the drop-off preventing regulating surfaces are formed as concave spherical surfaces about the spherical center, and symmetrically arranged with respect to the optical axis of the lens. Thus, an area for the drop-off preventing regulating surfaces can be minimized with respect to the entire range in which the movable unit rolls. Therefore, the camera driving apparatus can be downsized.

Further, the drop-off preventing regulating surfaces are positioned so that, even when the movable unit separates from the fixing unit to an extent that the convex partial spherical surface of the movable unit abuts against the drop-off preventing regulating surfaces of the fixing unit, the convex partial spherical surface of the movable unit and the concave conical surface of the fixing unit can be brought into contact with each other again by the magnetic attraction forces. Thus, it is possible to provide a camera driving apparatus markedly excellent in impact resistance, which is capable of immediately restoring an original satisfactory support state even when the movable unit momentarily drops off.

Further, each of the drive portions in the panning direction, the tilting direction, and the rolling direction is formed of the two pairs of drive magnets fixed to the movable unit and the two pairs of drive coils provided to the fixing unit circumferentially around the optical axis so that the two pairs of drive coils respectively face the two pairs of drive magnets, the two pairs of drive magnets and the two pairs of drive coils being arranged respectively on the two lines orthogonal to each other in the plane perpendicular to the optical axis.

Height positions in the direction of the optical axis, at which those components are arranged, are arranged at height positions on the two lines tilted downward with respect to the horizontal plane including the spherical center. Thus, the movable unit can be driven in the state where the center of gravity is coincident to the spherical center, and the height can be reduced.

Further, through formation of the movable portion and the base with a resin material or through covering of the surface parts of the convex partial spherical surface and the concave conical surface with a resin member, a support structure which involves low friction and is excellent in abrasion resistance can be provided.

Further, through filling of the viscous member into the gaps formed between the convex partial spherical surface of the movable unit and the drop-off preventing regulating surfaces, the amplitude increase coefficient (Q factor) of vibration caused by the magnetic spring effect derived from variation of the magnetic attraction force generated between the drive magnets provided to the movable unit and the magnetic yokes provided to the fixing unit and the Q factor of the inherent mechanical vibration can be reduced. Thus, satisfactory control characteristics can be obtained.

Further, the pair of rotation detecting magnets magnetized oppositely to each other in the circumferential direction about the position of the optical axis in the plane perpendicular to the optical axis are provided to the movable unit portion, and the second magnetic sensors provided to the fixing unit detect the magnetism variation. With use of the detection output, crosstalk outputs generated in a case where the movable unit is rolled in the panning direction and the tilting direction can be cancelled. Thus, only the angle in the rolling direction can be extracted and detected within the range in which the movable unit can be rolled.

Further, with respect to the fixing unit, the pair of second magnetic sensors are arranged on the straight lines each of which forms an angle of 45 degrees with respect to the tilting direction rotation axis or the panning direction rotation axis. Thus, the drive portions and the second magnetic sensors can be arranged on the circumference around the optical axis. As a result, the camera driving apparatus can be downsized.

Thus, according to the camera driving apparatus in this embodiment, for example, the movable unit can be tilted at a large angle of ±10 degrees or more in the panning direction and the tilting direction. Further, the movable unit can be rotated at a large angle of ±10 degrees or more in the rolling direction. Still further, satisfactory blur-correction control can be performed in a wide-band frequency range of up to approximately 50 Hz. As a result, it is possible to provide a camera driving apparatus capable of performing a high-speed panning operation, a high-speed tilting operation, and a high-speed rolling operation of the camera portion, and capable of correcting image blurs of an image to be taken, which are caused by the camera shake during photographing while walking. In addition, the camera driving apparatus is provided with the small and rigid drop-off preventing structure, and hence is excellent in resistance to impact from outside, such as vibration and drop impact.

Second Embodiment

In the following, description is made of a camera driving apparatus according to a second embodiment of the present invention.

Figure 15:
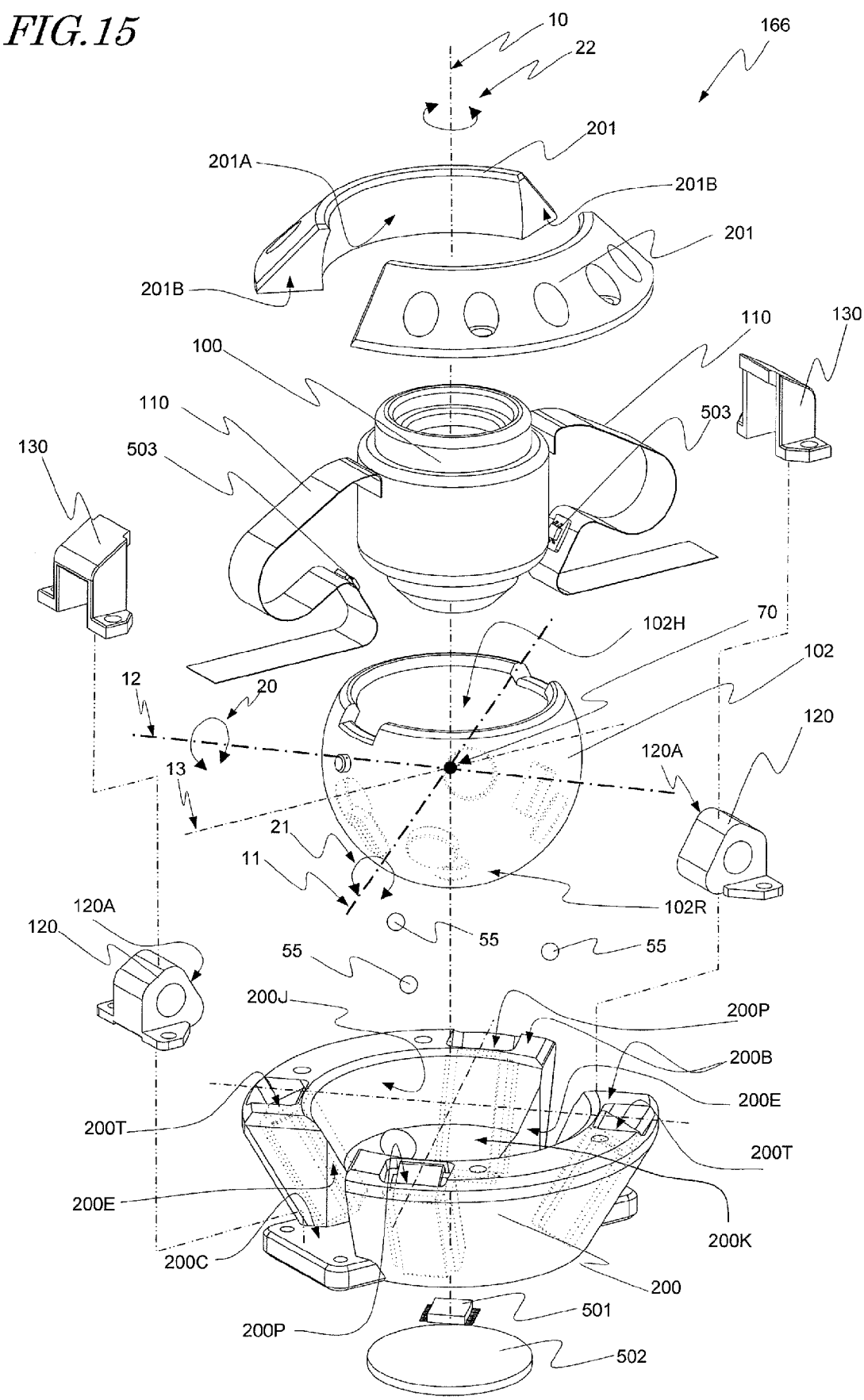
FIG. 15 is an exploded perspective view illustrating a schematic structure of a second embodiment of the present invention.
Figure 16:
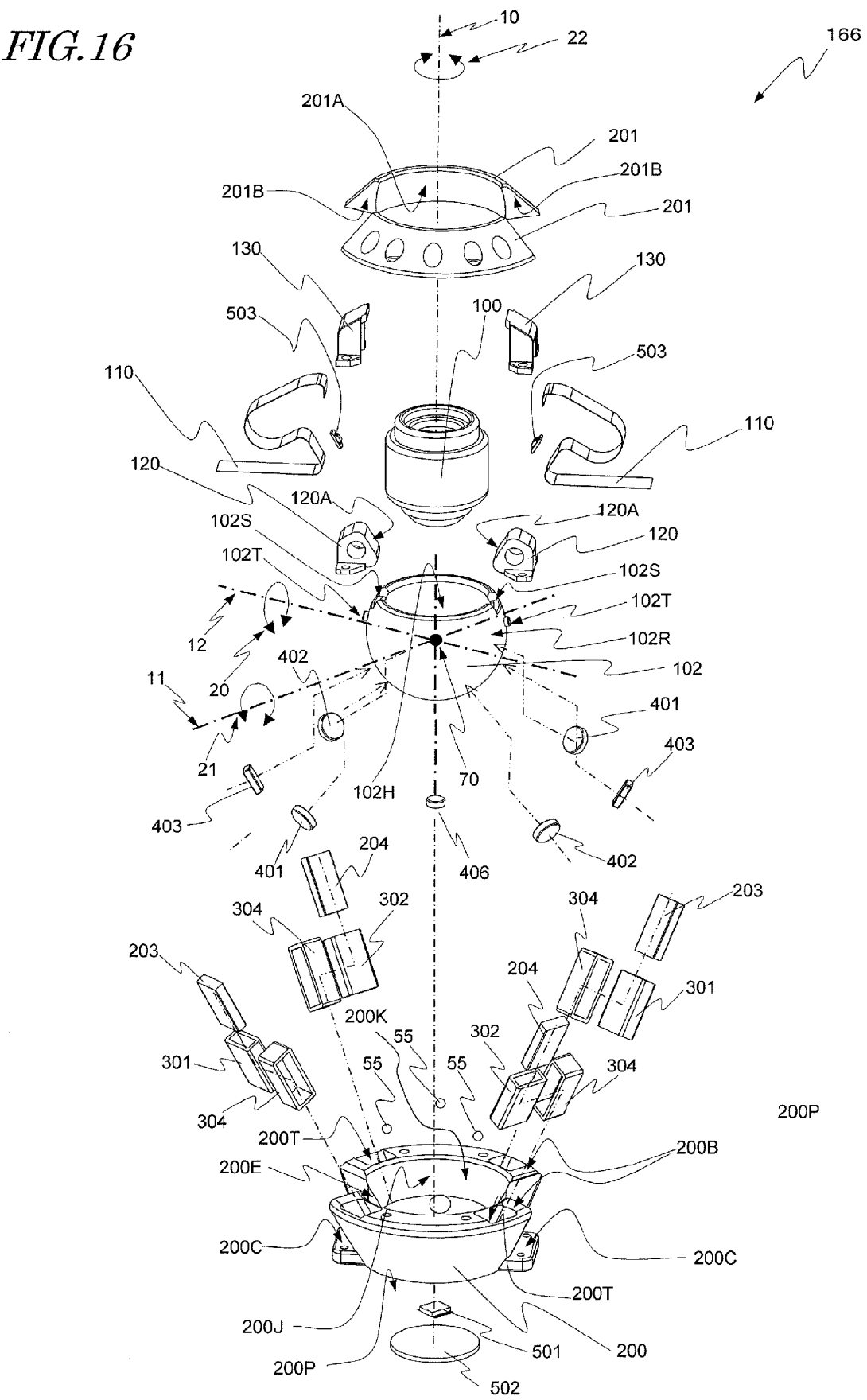
FIG. 16 is an exploded perspective view illustrating in detail the structure of the second embodiment of the present invention.
Figure 17:
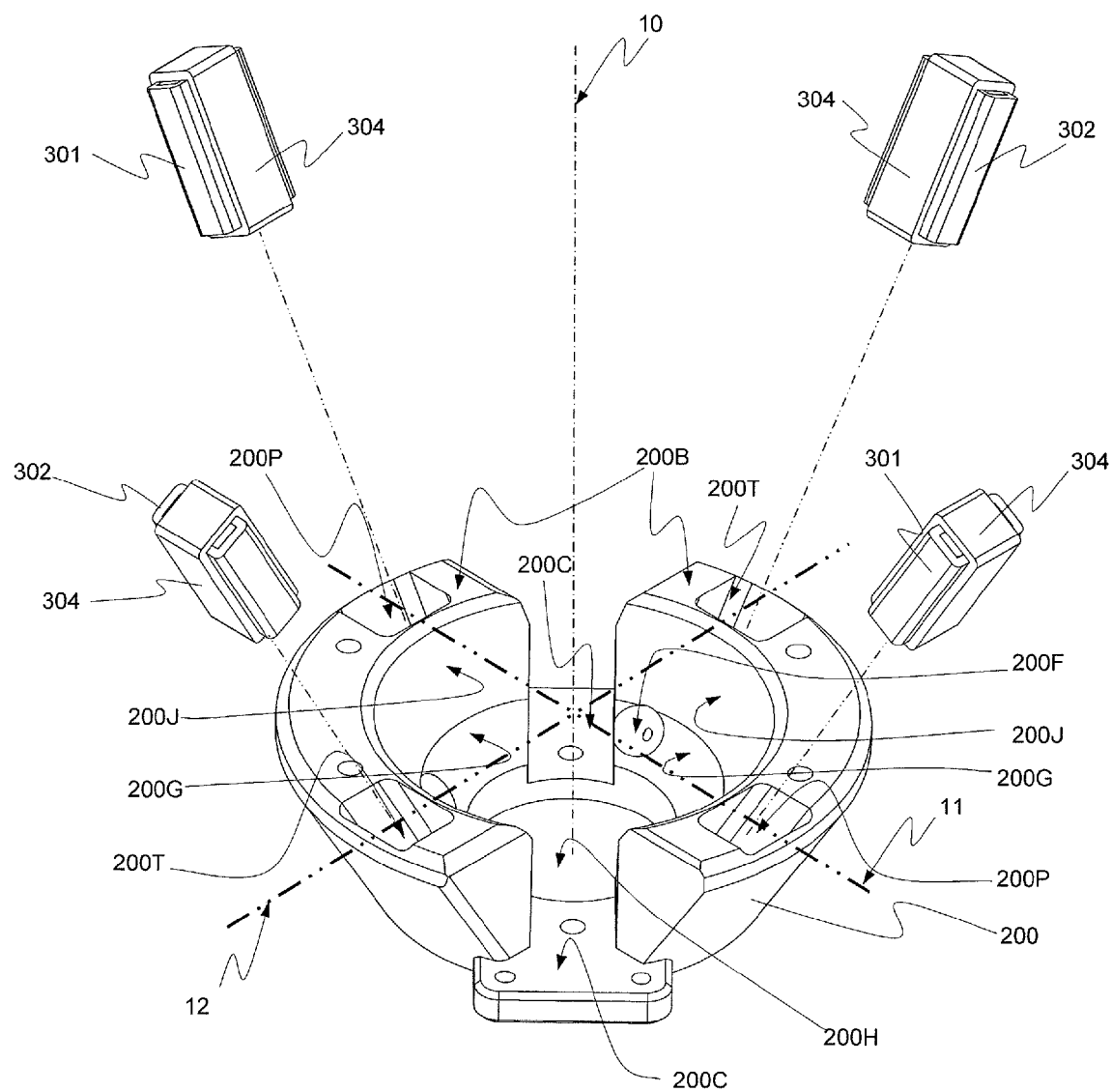
FIG. 17 is a perspective view in which a fixing unit of the second embodiment of the present invention is viewed from above.
Figure 18:
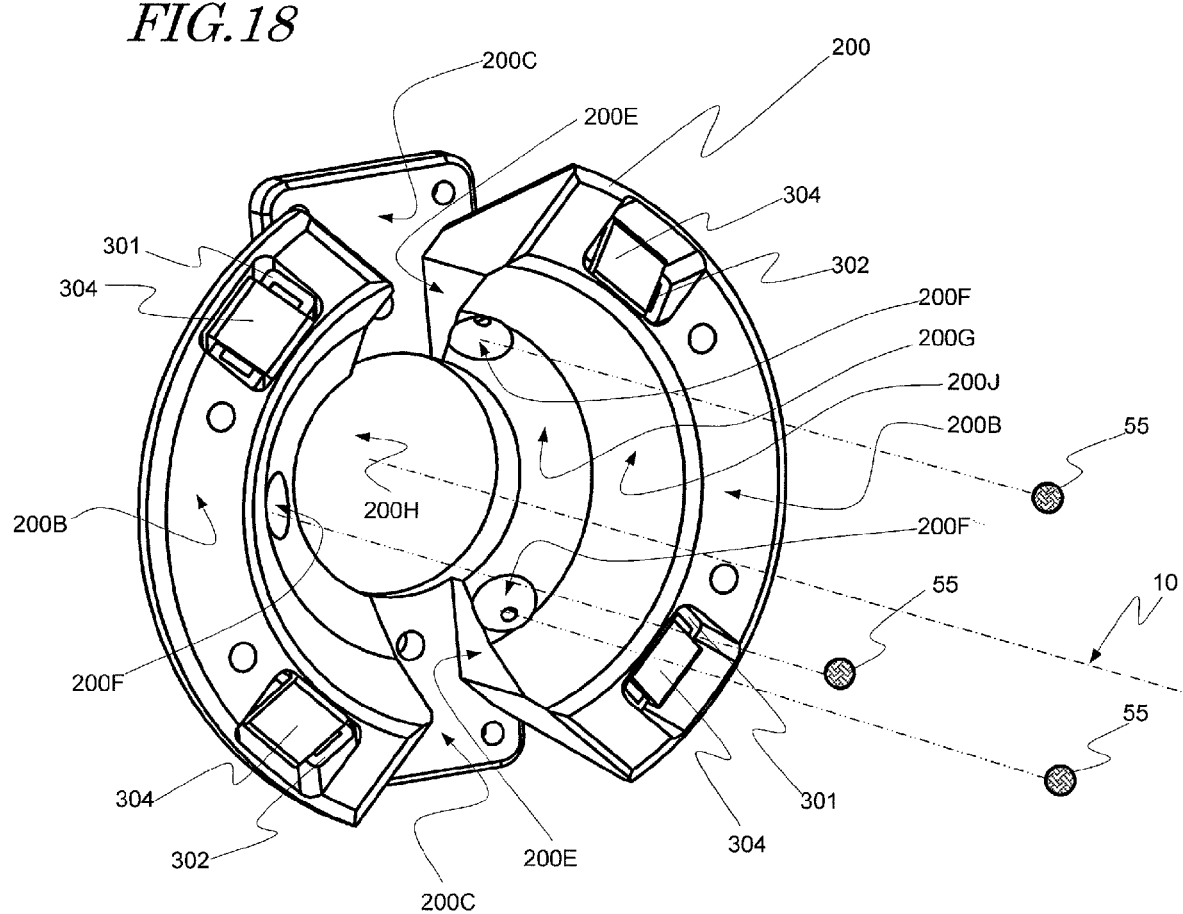
FIG. 18 is an exploded perspective view illustrating a positional relationship of the fixing unit and support balls 55 of the second embodiment of the present invention.
Figure 21:
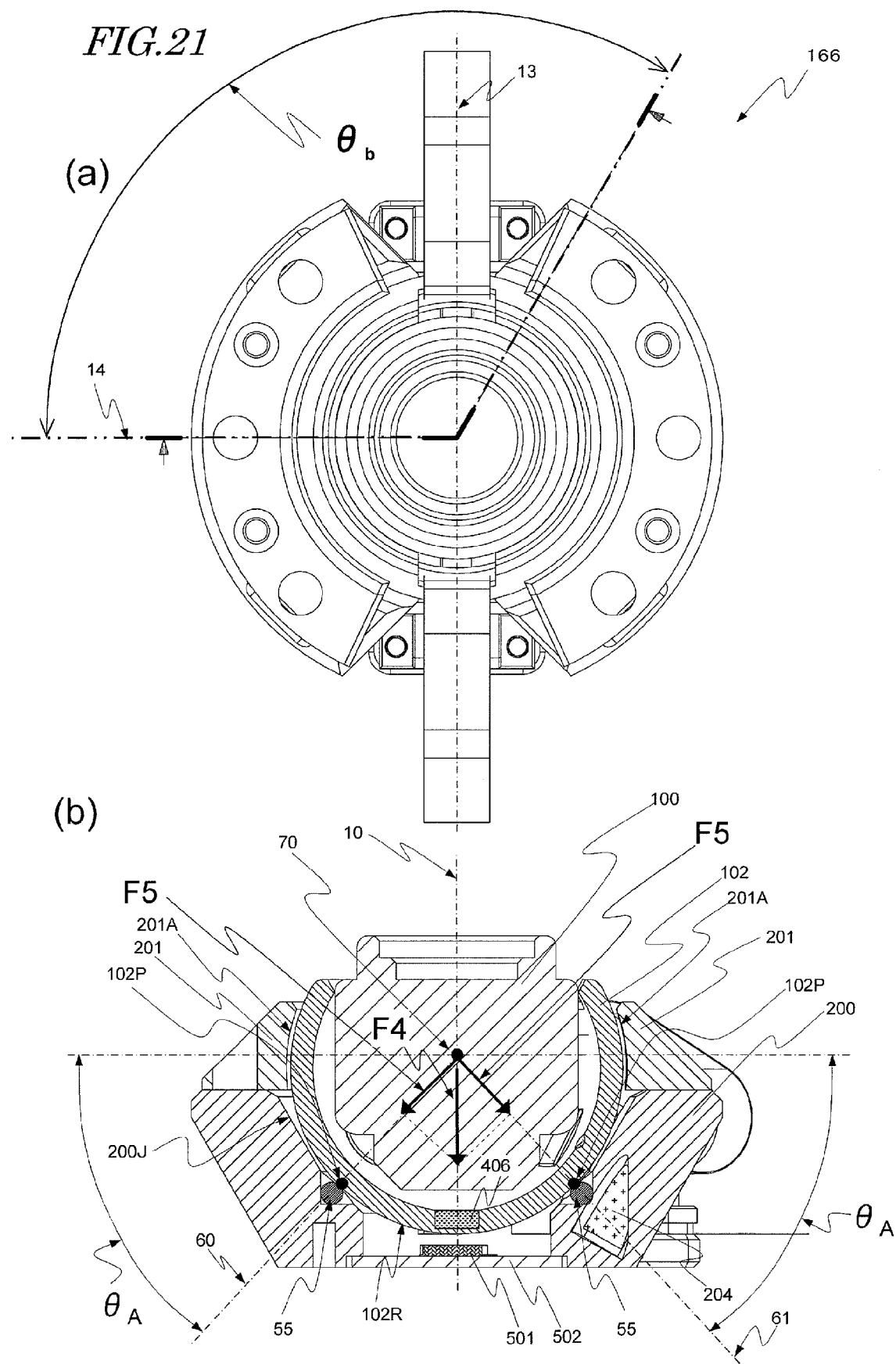
FIGS. 21(a) and (b) are a top view and a revolved sectional view taken along the plane including the optical axis 10 and the centers of the support balls 55, respectively, according to the second embodiment of the present invention.

FIG. 15 is an exploded perspective view illustrating a schematic structure of a camera driving apparatus 166 according to the second embodiment. FIG. 16 is an exploded perspective view illustrating in detail the structure of the camera driving apparatus 166 according to the second embodiment. FIG. 17 is a perspective view in which the fixing unit of the camera driving apparatus 166 according to the second embodiment is viewed from above. FIG. 18 is an exploded perspective view illustrating a positional relationship of the fixing unit and support balls 55. FIG. 19(*a*) is a top view of the fixing unit, and FIG. 19(*b*) is a sectional view taken along a plane including the optical axis 10 and the tilting direction rotation axis 11. FIG. 20(*a*) is a top view of the fixing unit, and FIG. 20(*b*) is a revolved sectional view of the fixing unit taken along a plane including the optical axis 10 and centers of the support balls 55. FIG. 21(*a*) is a top view of the camera driving apparatus 166, and FIG. 21(*b*) is a revolved sectional view taken along the plane including the optical axis 10 and the centers of the support balls 55. In those figures, the same components as those in the first embodiment are denoted by the same reference symbols.

As illustrated in FIGS. 15 and 16, the camera driving apparatus 166 is different from the camera driving apparatus 165 according to the first embodiment in that the rotational drive portion dedicated for driving the movable unit to be rotated in the rolling direction 22 is not provided.

Further, the dedicated rotational drive portion is not provided, and hence spaces for the components can be sufficiently secured. In order to minimize friction to be generated between the convex partial spherical surface 102R of the movable portion 102 and the fixing unit by utilizing the sufficient spaces, the fixing unit is provided with at least three convex partial spherical surfaces to be positioned in the concave portion 200K of the base 200. Also in this regard, the camera driving apparatus 166 is different from the camera driving apparatus 165 according to the first embodiment.

As illustrated in FIG. 17, in the camera driving apparatus 166, in order to rotate the movable unit in the rolling direction 22, the pair of panning magnetic yokes 203 and the pair of tilting magnetic yokes 204 are used also as the rolling magnetic yokes. The camera driving apparatus 166 includes four rolling drive coils 304 respectively wound around the magnetic yokes. Further, the pair of panning drive magnets 401 and the pair of tilting drive magnets 402 are used also as the rolling drive magnets.

In other words, unlike the first embodiment, the camera driving apparatus 166 is free from the rolling drive magnets 405 mounted to the movable portion 102, or the rolling magnetic yokes 205 and the rolling drive coils 303 provided to the base 200. In addition, even the opening portions 200R are not provided. The camera driving apparatus 166 has such a simple structure.

Further, as illustrated in FIG. 17, the rolling drive coils 304 are wound so as to be laminated crisscross around the pair of panning magnetic yokes 203 and the pair of tilting magnetic yokes 204 orthogonally to a coil winding direction of each of the panning drive coils 301 and the tilting drive coils 302. The rolling drive coils 304 are inserted and fixed respectively to the opening portions 200P and 200T of the base 200. With this, space saving and downsizing of the fixing unit can be achieved, and the number of components can be reduced.

Next, with reference to FIGS. 18 to 21, description is made of a structure for markedly reducing the friction to be generated between the convex partial spherical surface 102R of the movable portion 102 and the fixing unit. The fixing unit of the camera driving apparatus 166 includes the at least three convex partial spherical surfaces in the concave portion 200 of the base 200. In this embodiment, description is made of an example in which the three convex partial spherical surfaces are formed of the three support balls 55. However, a feature of this embodiment is support for the concave portion 200 of the base 200 and the convex partial spherical surface 102R of the movable portion 102 by contact at least at three points. Thus, a specific structure for performing the support is not limited to the support balls. For example, the support structure may be formed of projecting portions each formed of a resin or the like and respectively having three convex partial spherical surfaces.

As illustrated in FIG. 18, inside the base 200, there are formed conical surfaces of two types: a concave conical surface 200J having the same tilt angle as that of the concave conical surface 200A in the first embodiment and being out of contact with the convex partial spherical surface 102R; and a concave conical surface 200G having a tilt angle different from that of the concave conical surface 200J.

As illustrated in FIGS. 19 and 20, the concave conical surface 200G is added to the base 200, the concave conical surface 200G having a tilt angle orthogonal to straight lines 38, 39, 60, and 61 each tilted at a tilt angle $\theta_c$ downward with respect to the horizontal plane which is orthogonal to the optical axis 10 and includes the spherical center 70 of the convex partial spherical surface 102R of the movable portion 102. The tilt angle $\theta_c$ is set, for example, to 45 degrees.

Further, in a region of the concave conical surface 200G, when viewed from the direction of the optical axis 10, three conical portions 200F are arranged in the concave conical surface 200G at angles $\theta_b$ from the straight line 14 forming the angle of 45 degrees with respect to each of the panning direction rotation axis 12 and the tilting direction rotation axis 11. Each of the conical portions 200F has a conical inner side surface. In order to uniformly support the movable unit, it is preferred to set each of the angles $\theta_b$ to 120 degrees.

The three support balls 55 are inserted respectively into the three conical portions 200F, and held in linear contact with the inner side surfaces. The support balls 55 project from the concave conical surface 200G and the concave conical surface 200J. The three support balls 55 each have a convex partial spherical surface, and are held in contact with the convex partial spherical surface 102R of the movable portion 102 at three contact points 102P.

As illustrated in FIG. 20, the straight lines 60 and 61 which connect spherical centers of the convex partial spherical surfaces of the respective support balls 55, in other words, spherical centers of the respective support balls 55, and the spherical center 70 of the convex partial spherical surface 102R of the movable portion 102 each form the tilt angle $\theta_c$ downward with respect to the horizontal plane P which is perpendicular to the optical axis 10 and includes the spherical center 70 of the convex partial spherical surface 102R. The tilt angle $\theta_c$ is preferably 30 degrees to 60 degrees, more preferably 45 degrees.

With this, the movable portion 102 is supported at only three points with respect to the fixing unit, and the support balls 55 are rotatable. Thus, friction to be generated between the movable unit and the fixing unit can be minimized, and hence the movable unit can be operated with markedly satisfactory operability.

Further, as illustrated in FIG. 21, each of the panning magnetic yokes 203 and the tilting magnetic yokes 204, which are used also as the rolling magnetic yokes and inserted inside the base 200, is formed of a magnetic body. Thus, magnetic attraction forces F5 are generated between the panning drive magnets 401 and the panning magnetic yokes 203 and between the tilting drive magnets 402 and the tilting magnetic yokes 204, the panning drive magnets 401 and the tilting drive magnets 402 being used also as the rolling drive magnets and provided on the inner side of the movable portion 102 so as to respectively face the panning magnetic yokes 203 and the tilting magnetic yokes 204. Each of the magnetic attraction forces F5 acts as a normal force between the convex partial spherical surface 102R of the movable unit and the three support balls 55. In addition, the magnetic attraction force F4 is obtained as a resultant vector in the direction of the optical axis 10.

In this way, unlike the movable unit of the first embodiment, the movable unit can be supported by the balls at three points with respect to the fixing unit, and the support balls 55 are equiangularly arranged at 120 degrees about the optical axis 10. Thus, a markedly stable support structure and markedly excellent operability can be provided. In particular, through setting of the tilt angle $\theta_c$ to approximately 45 degrees, a force onto circumferential linear contact parts of the support balls 55 and the conical portions 200F of the base 200 is equalized by the magnetic attraction force F4. Thus, a frictional coefficient between the movable unit and the fixing unit can be further reduced.

Note that, as a matter of course, the three support balls 55 are prevented from dropping off by the drop-off preventing regulating surfaces 201A of the drop-off preventing members 201 even when the camera driving apparatus 166 is subjected to impact.

Further, unlike the first embodiment, the rolling drive magnets 405 mounted to the movable portion 102 and the rolling magnetic yokes 205 and the rolling drive coils 303 provided to the base 200 are omitted. Thus, the number of components can be markedly reduced.

Thus, according to the camera driving apparatus in the second embodiment of the present invention, for example, the movable unit can be tilted at a large angle of ±10 degrees or more in the panning direction and the tilting direction. Further, the movable unit can be rotated at a large angle of ±10 degrees or more in the rolling direction. Still further, satisfactory blur-correction control can be performed in the wideband frequency range of up to approximately 50 Hz.

As a result, it is possible to provide a camera driving apparatus capable of performing a high-speed panning operation, a high-speed tilting operation, and a high-speed rolling operation of the camera portion, and capable of correcting image blurs of an image to be taken, which are caused by the camera shake in photographing while walking. In addition, the camera driving apparatus is provided with the small and rigid drop-off preventing structure, and hence is excellent in resistance to impact from outside, such as vibration and drop impact.

Third Embodiment

Figure 22:
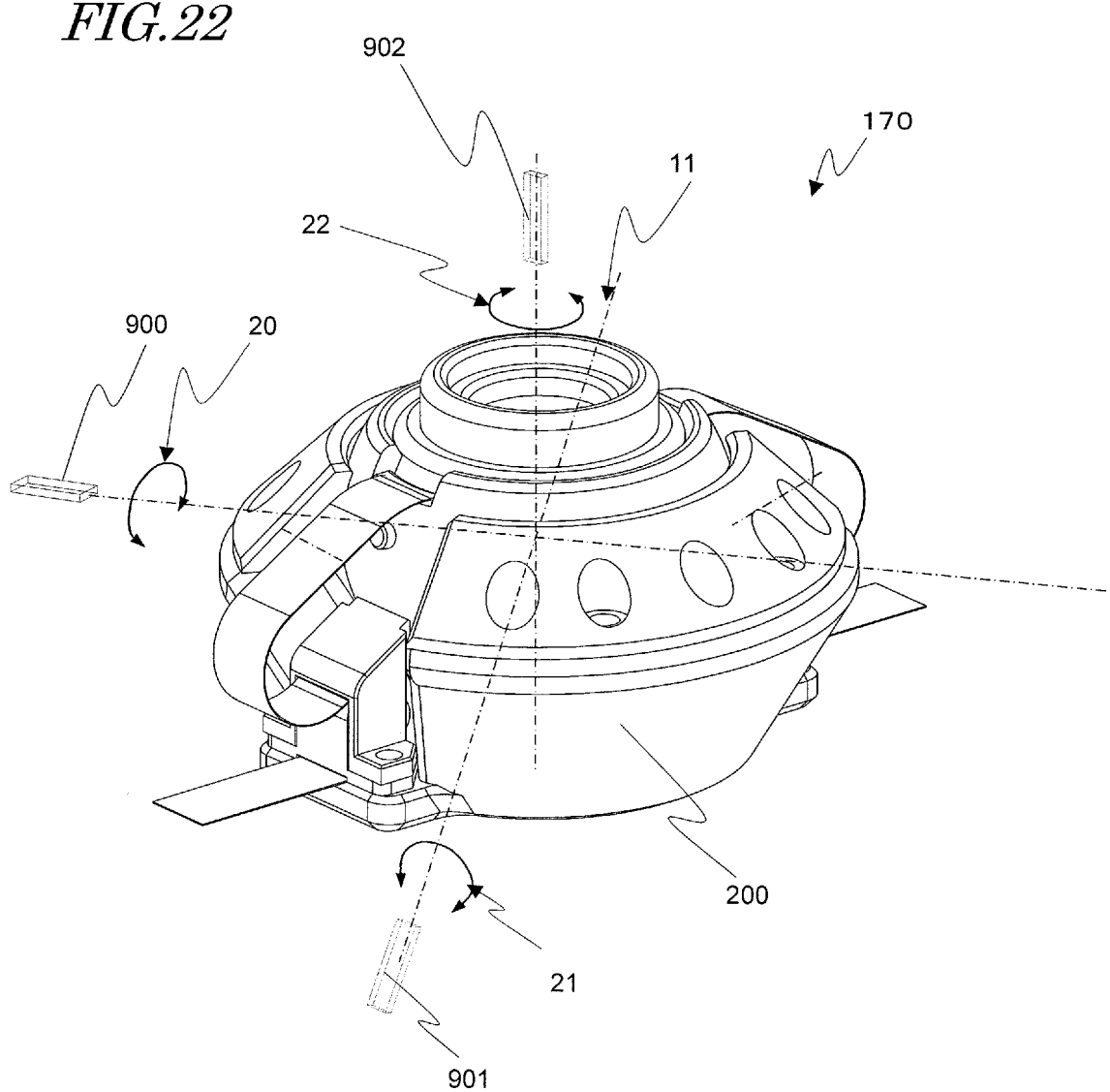
FIG. 22 is a perspective view illustrating an arrangement of angular velocity sensors to be provided to a camera unit according to a third embodiment of the present invention.
Figure 23:
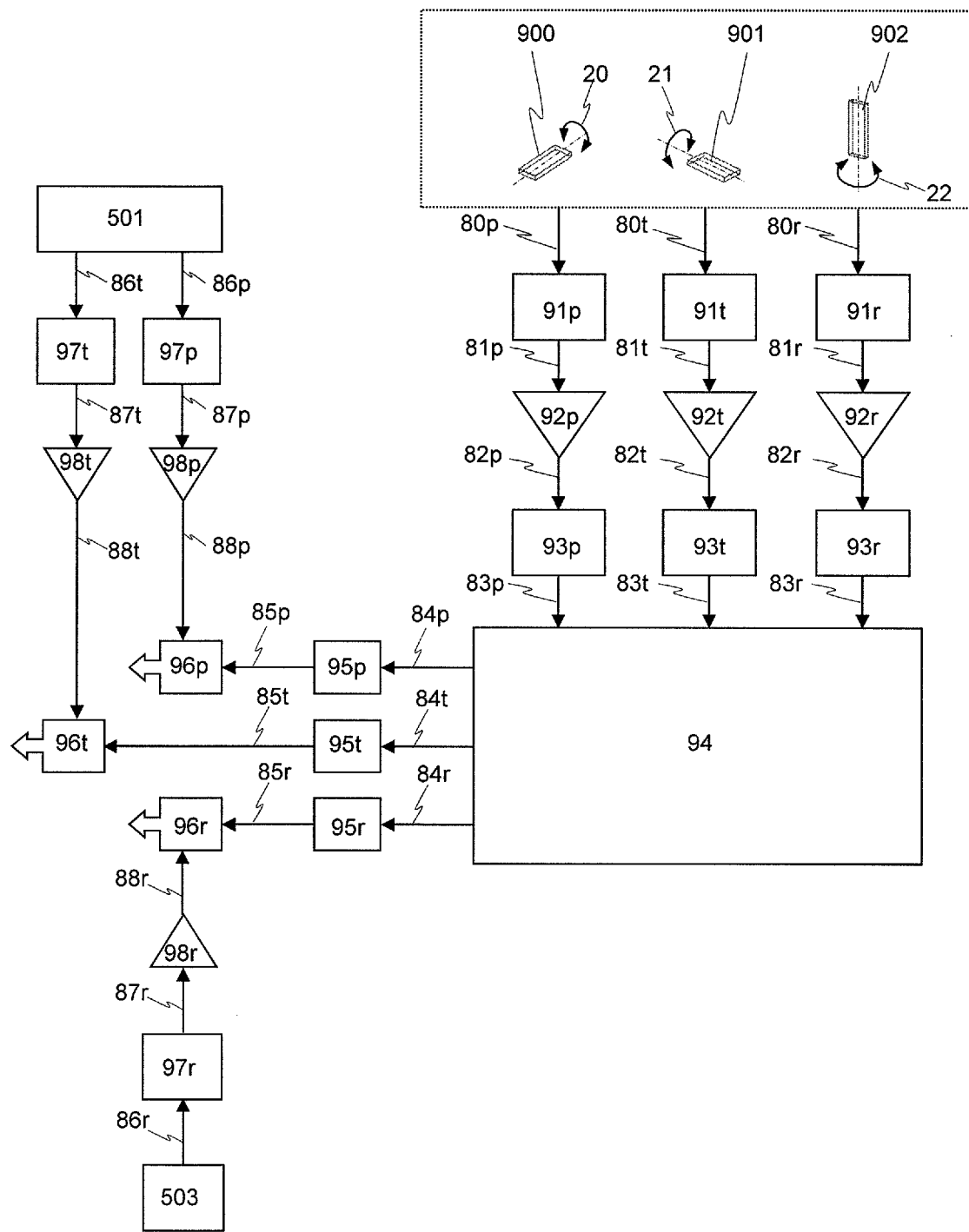
FIG. 23 is a block diagram illustrating the embodiment of the camera unit.

Description is made of a camera unit according to an embodiment of the present invention. A camera unit 170 according to a third embodiment of the present invention includes a camera driving apparatus and a control portion, and hence is capable of correcting image blurs caused during walking. FIG. 22 is a perspective view illustrating a main portion of the camera unit 170, and FIG. 23 is a block diagram of the camera unit 170. Although FIG. 22 illustrates the camera driving apparatus 165 according to the first embodiment, the camera driving apparatus 166 according to the second embodiment may be employed.

As illustrated in FIGS. 22 and 23, the camera unit 170 includes the camera driving apparatus 165, angular velocity sensors 900, 901, and 902, an arithmetic processing portion 94, and drive circuits 96p, 96t, and 96r.

The angular velocity sensors 900, 901, and 902 are mounted to the base 200 of the camera driving apparatus or a camera-unit main body (not shown) which fixes the base 200. The angular velocity sensors 900, 901, and 902 respectively detect angular velocities about axes indicated by broken lines in FIG. 22. Specifically, the angular velocity sensors 900, 901, and 902 respectively detect the angular velocities in the panning direction 20, the tilting direction 21, and the rolling direction 22. Note that, although FIG. 22 illustrates the three angular velocity sensors 900, 901, and 902 independent of each other, one angular velocity sensor capable of detecting the angular velocities about the three axes may be employed. Further, it suffices that the angular velocity sensors are capable of detecting the angular velocities about three axes orthogonal to one another, and hence the three axes do not need to correspond to the panning direction 20, the tilting direction 21, and the rolling direction 22. When the axes of the angular velocities to be detected by the angular velocity sensors do not correspond to the panning direction 20, the tilting direction 21, and the rolling direction 22, it suffices that the arithmetic processing portion 94 converts the angular velocities into angular velocities in the panning direction 20, the tilting direction 21, and the rolling direction 22.

For example, shake angles in the panning direction 20 and the tilting direction 21, which are formed by the camera shake during photographing, are detected respectively by the angular velocity sensors 900 and 901. Further, a shake angle in the rolling direction 22, which is formed by a shift of the center of gravity during photographing while walking, is detected by the angular velocity sensor 902. As illustrated in FIG. 23, information pieces about the shake angles, which are detected by the angular velocity sensors 900, 901, and 902, are output respectively as angular velocity signals 80p, 80t, and 80r.

The arithmetic processing portion 94 converts the angular velocity signals 80p, 80t, and 80r into signals suitable to arithmetic processes. Specifically, the angular velocity signals 80p, 80t, and 80r are input to analog circuits 91p, 91t, and 91r, and noise components and DC drift components are removed. Angular velocity signals 81p, 81t, and 81r, which are obtained by removing the noise components and the DC drift components, are input to amplifier circuits 92p, 92t, and 92r, and then output as angular velocity signals 82p, 82t, and 82r at appropriate output values, respectively. After that, AD converters 93p, 93t, and 93r convert the angular velocity signals 82p, 82t, and 82r into digital signals, and angular velocity signals 83p, 83t, and 83r obtained by the digitization are input to the arithmetic processing portion 94.

The arithmetic processing portion 94 performs integral processes for converting the angular velocities into angles formed by camera shake, and sequentially calculates shake angles in the panning direction 20, the tilting direction 21, and the rolling direction 22. Further, a tri-axial blur correcting process is performed. The tri-axial blur correcting process performed by the arithmetic processing portion 94 is open-loop control for driving the movable unit provided with the camera portion 100 so that angular velocities are suppressed in response to the angular velocity signals 83p, 83t, and 83r detected respectively by the angular velocity sensors 900, 901, and 902. The arithmetic processing portion 94 sequentially outputs target rotation angle signals 84p, 84t, and 84r as optimum digital blur correcting amounts including frequency response characteristics, phase compensation, and gain correction of the camera driving apparatus 165.

The target rotation angle signals 84p, 84t, and 84r are converted into analog signals by DA converters 95p, 95t, and 95r, and then input as analog target rotation angle signals 85p, 85t, and 85r to the drive circuits 96p, 96t, and 96r.

Meanwhile, in the camera driving apparatus 165, the first magnetic sensor 501 and the second magnetic sensors 503 for detecting the rotation angles of the movable unit provided with the camera portion 100 with respect to the base 200 output rotation angle signals 86p, 86t, and 86r in the panning direction 20, the tilting direction 21, and the rolling direction 22. Then, analog circuits 97p, 97t, and 97r remove noise components and DC drift components of the rotation angle signals 86p, 86t, and 86r, and rotation angle signals 87p, 87t, and 87r are obtained. Further, amplifier circuits 98p, 98t, and 98r output rotation angle signals 88p, 88t, and 88r at appropriate output values, and then the output rotation angle signals 88p, 88t, and 88r are input to the drive circuits 96p, 96t, and 96r.

The drive circuits 96p, 96t, and 96r has feedback systems for feeding back the rotation angle signals 88p, 88t, and 88r respectively to the target rotation angle signals 85p, 85t, and 85r. Thus, when a force from outside does not act on the camera unit 170, the drive circuits 96p, 96t, and 96r control the angles of the movable unit provided with the camera portion 100 in the panning direction 20, the tilting direction 21, and the rolling direction 22 so that the movable unit comes to predetermined rotation angle positions. Based on the target rotation angle signals 85p, 85t, and 85r and the rotation angle signals 88p, 88t, and 88r, the drive circuits 96p, 96t, and 96r output drive signals for driving the panning drive coils 301, the tilting drive coils 302, and the rolling drive coils 303. In this way, in the camera driving apparatus 165, feedback control on the angular positions is performed, in other words, the movable portion 102 provided with the camera portion 100 is driven so that the rotation angle signals 88p, 88t, and 88r are equalized to the target rotation angle signals 85p, 85t, and 85r.

With this series of drive control, blur correction of the camera portion 100 is performed, and satisfactorily stable photographing can be performed even while walking.

The third embodiment of the present invention illustrates a control system mainly with use of the rotation angle signals obtained by integrating outputs from the angular velocity sensors. However, the rotation angle signals 88p, 88t, and 88r may be input from the first magnetic sensor 501 and the second magnetic sensors 503 of the camera driving apparatus to the arithmetic processing portion 94 via the AD converters, and then subjected to a differential arithmetic process. Also in this way, the rotation angle signals of the camera portion 100 can be detected. With this, angular velocity feedback systems using the angular velocity signals 83p, 83t, and 83r from the camera device and the rotation angle signals from the camera portion 100 can be further established in the arithmetic processing portion 94. As a result, camera shake and shake while walking can be suppressed with higher accuracy.

The camera driving apparatus and the camera unit according to the present invention are capable of rotating the camera portions at larger angle in comparison with those of conventional camera-shake correction devices. Thus, according to the camera driving apparatus and the camera unit of the present invention, it is possible to provide a camera driving apparatus capable of following an object, which has been specified in an image through image processes and the like, so that the object comes to, for example, a center of a display.

Further, it is possible to provide a camera driving apparatus capable of ultra-wide angle photographing of still images and moving images by photographing still images or moving images while rotating the camera portion in the panning direction or the tilting direction and by sequentially combining the shot still images and moving images.

Note that, in the first to third embodiments, description has been made of the camera unit and the camera driving apparatus provided with the camera portion, but the present invention is applicable to a drive device provided with a light-emitting device and a light-receiving device other than the camera portion and being capable of driving the light-emitting device and the light-receiving device freely in tri-axial directions. For example, the present invention is applicable to a drive device including a movable unit provided with laser elements and optical detection elements instead of the camera portion and being capable of driving the laser elements and the optical detection elements freely in tri-axial directions. In those cases, the rolling drive portion does not need to be provided when rotation in the rolling direction is unnecessary.

Further, in the first to third embodiments, the panning drive magnets, the tilting drive magnets, and the rolling drive magnets are used as attracting magnets, and the panning magnetic yokes, the tilting magnetic yokes, and the rolling magnetic yokes are used as magnetic bodies. However, as the attracting magnets and the magnetic bodies, the camera driving apparatus may include other magnets or magnetic bodies than those drive magnets and magnetic yokes.

INDUSTRIAL APPLICABILITY

The camera driving apparatus according to the present invention have a structure capable of driving the movable unit in the panning direction, the tilting direction, and the rolling direction. Thus, tri-axial blurs, which include rolling shake and are generated by a shift of the center of gravity of a photographer during photographing while walking, can be corrected. As a result, the camera driving apparatus according to the present invention can be suitably used in various image pickup devices which require image blur correction, such as a wearable camera. Further, the camera driving apparatus according to the present invention are suitable to high-speed following cameras, surveillance cameras, in-vehicle cameras, and the like which require a high-speed panning operation, a high-speed tilting operation, and a high-speed rolling operation for photographing objects.

In addition, through the high-speed panning operation and the high-speed tilting operation, shot images can be combined with each other at high speed. As a result, it is possible to provide a video camera capable of ultra-wide angle photographing of not only still images but also moving images.

REFERENCE SIGNS LIST 10 optical axis
11, 12 rotation axis
13, 14 straight line
20 panning direction
21 tilting direction
22 rolling direction
30-45 straight line
50 gap
55 support ball
70 spherical center
100 camera portion
102 movable portion
102R convex partial spherical surface
102S cutout portion
102T rotation regulating protruding portion
165, 166 camera driving apparatus
170 camera unit
200 base
200A, 200J, 200G concave conical surface
200P, 200T, 200R opening portion
201 drop-off preventing member
201A drop-off preventing regulating surface
203, 204, 205 magnetic yoke
301, 302, 303 drive coil
401, 402, 405 drive magnet
403 rotation detecting magnet
404 tilt detecting magnet
501, 503 magnetic sensor

The invention claimed is:
1. A camera driving apparatus, comprising:
   a camera portion comprising:
      an imaging element having an imaging plane;
      a lens for forming an object image on the imaging plane, the lens having an optical axis; and
      a lens barrel for holding the lens;
   a movable unit comprising at least one attracting magnet, incorporating the camera portion, and having an outer shape formed as a first convex partial spherical surface;
   a fixing unit which comprises at least one magnetic body and a concave portion to which at least a part of the movable unit is loosely fitted, and in which a magnetic attraction force of the at least one attracting magnet with respect to the at least one magnetic body causes the first convex partial spherical surface of the movable unit and the concave portion to be held in point contact or linear contact with each other, thereby enabling the movable unit to freely rotate about a spherical center of the first convex partial spherical surface;
   a panning drive portion for tilting the camera portion in a panning direction with respect to the fixing unit, the panning drive portion comprising:
      a pair of panning drive magnets arranged in the movable unit symmetrically with respect to the optical axis;
      a pair of panning magnetic yokes arranged in the fixing unit so as to respectively face the pair of panning drive magnets; and
      a pair of panning drive coils wound respectively around the pair of panning magnetic yokes;

a tilting drive portion for tilting the camera portion in a tilting direction, which is orthogonal to the panning direction, with respect to the fixing portion, the tilting drive portion comprising:
- a pair of tilting drive magnets arranged in the movable unit symmetrically with respect to the optical axis;
- a pair of tilting magnetic yokes arranged in the fixing unit so as to respectively face the pair of tilting drive magnets; and
- a pair of tilting drive coils wound respectively around the pair of tilting magnetic yokes;

a rolling drive portion for rotating the camera portion in a rolling direction, in which the camera portion is rotated about the optical axis of the lens, with respect to the fixing unit;

a detector for detecting:
- a tilt angle of the camera portion in the panning direction with respect to the fixing unit;
- a tilt angle of the camera portion in the tilting direction with respect to the fixing unit; and
- a rotation angle of the camera portion to be rotated in the rolling direction with respect to the fixing unit; and wiring components connected to the camera portion and each formed of a flexible printed wiring board;

wherein the wiring components are linearly symmetrically arranged with respect to the optical axis, and are fixed to the movable unit in a direction in which an angle of 45 degrees is formed with respect to a line connecting the pair of tilting drive magnets to each other or a line connecting the pair of panning drive magnets to each other in a plane perpendicular to the optical axis.

2. A camera driving apparatus according to claim 1, wherein the fixing unit has at least three second convex partial spherical surfaces to be positioned in the concave portion, the at least three second convex partial spherical surfaces and the first convex partial spherical surface of the movable unit being held in point contact with each other.

3. A camera driving apparatus according to claim 1, wherein the fixing unit has a concave conical surface forming an inner side surface of the concave portion, the concave conical surface and the first convex partial spherical surface of the movable unit being held in linear contact with each other.

4. A camera driving apparatus according to claim 1, further comprising a drop-off preventing member provided to the fixing unit and having a regulating surface for restricting movement of the movable unit so as to prevent the movable unit from dropping off from the fixing unit, the regulating surface having a concave partial spherical surface having a center which coincides with the spherical center of the first convex partial spherical surface.

5. A camera driving apparatus according to claim 1, wherein the rolling drive portion comprises:
- a pair of rolling drive magnets arranged in the movable unit on a straight line passing through the optical axis, the pair of rolling drive magnets forming an angle of 45 degrees with respect to a straight line connecting the pair of panning drive magnets to each other and a straight line connecting the pair of tilting drive magnets to each other in a plane perpendicular to the optical axis;
- a pair of rolling magnetic yokes arranged in the fixing unit so as to respectively face the pair of rolling drive magnets; and
- a pair of rolling drive coils wound respectively around the pair of rolling magnetic yokes.

6. A camera driving apparatus according to claim 1, wherein the rolling drive portion comprises four rolling drive coils wound respectively around the pair of the panning magnetic yokes and the pair of tilting magnetic yokes, and
wherein the pair of panning drive magnets and the pair of tilting drive magnets are used as rolling drive magnets.

7. A camera driving apparatus according to claim 5, wherein the at least one magnetic body comprises the pair of panning magnetic yokes, the pair of tilting magnetic yokes, and the pair of rolling magnetic yokes.

8. A camera driving apparatus according to claim 6, wherein the at least one magnetic body comprises the pair of panning magnetic yokes and the pair of tilting magnetic yokes.

9. A camera driving apparatus according to claim 7, wherein the at least one attracting magnet comprises the pair of panning drive magnets, the pair of tilting drive magnets, and the pair of rolling drive magnets.

10. A camera driving apparatus according to claim 8, wherein the at least one attracting magnet comprises the pair of panning drive magnets and the pair of tilting drive magnets.

11. A camera driving apparatus according to claim 1, wherein straight lines which are perpendicular to respective winding central axes of the pair of panning drive coils and pass through the spherical center of the first convex partial spherical surface and the pair of panning drive coils, and straight lines which are perpendicular to respective winding central axes of the pair of tilting drive coils and pass through the spherical center of the first convex partial spherical surface and the pair of tilting drive coils each form a tilt angle A of 45 degrees or less with respect to a horizontal plane which is perpendicular to the optical axis and includes the spherical center of the first convex partial spherical surface, and
wherein the pair of panning drive magnets and the pair of tilting drive magnets are arranged in the movable unit in a tilted manner so as to respectively face the pair of panning drive coils and the pair of tilting drive coils.

12. A camera driving apparatus according to claim 5, wherein straight lines which are perpendicular to respective winding central axes of the pair of rolling drive coils and pass through the spherical center of the first convex partial spherical surface each form a tilt angle B of 45 degrees or less with respect to a horizontal plane which is perpendicular to the optical axis and includes the spherical center of the first convex partial spherical surface and respective centers of the pair of rolling drive coils, and
wherein the pair of rolling drive magnets are arranged in the movable unit in a tilted manner so as to respectively face the pair of rolling drive coils.

13. A camera driving apparatus according to claim 11, wherein the tilt angle A is 20 degrees.

14. A camera driving apparatus according to claim 12, wherein the tilt angle B is 20 degrees.

15. A camera driving apparatus according to claim 2, wherein straight lines respectively connecting spherical centers of the at least three second convex partial spherical surfaces and the spherical center of the first convex partial spherical surface each form a tilt angle C of 45 degrees with respect to a horizontal plane which is perpendicular to the optical axis and includes the spherical center of the first convex partial spherical surface.

16. A camera driving apparatus according to claim 1, wherein the pair of panning drive magnets, the pair of tilting drive magnets, and the pair of rolling drive magnets are positioned on an inner side of the movable unit, and are prevented from being exposed on the first convex partial spherical surface.

17. A camera driving apparatus according to claim 5, wherein the pair of panning drive coils, the pair of tilting drive coils, and the pair of rolling drive coils are positioned inside the fixing unit, and are prevented from being exposed in the concave portion.

18. A camera driving apparatus according to claim 16, wherein the movable unit is made of a resin material.

19. A camera driving apparatus according to claim 18, wherein the movable unit is molded integrally with the pair of panning drive magnets, the pair of tilting drive magnets, and the pair of rolling drive magnets.

20. A camera driving apparatus according to claim 17, wherein the fixing unit is made of a resin material.

21. A camera driving apparatus according to claim 20, wherein the fixing unit is molded integrally with the pair of panning drive coils, the pair of tilting drive coils, the pair of rolling drive coils, the pair of panning magnetic yokes, the pair of tilting magnetic yokes, and the pair of rolling magnetic yokes.

22. A camera driving apparatus according to claim 1, wherein a center of gravity of the movable unit coincides with the spherical center of the first convex partial spherical surface.

23. A camera driving apparatus according to claim 1, wherein the detector comprises:
 a first detection portion for detecting:
  the tilt angle of the camera portion in the panning direction with respect to the fixing unit; and
  the tilt angle of the camera portion in the tilting direction with respect to the fixing unit; and
 a second detection portion for detecting the rotation angle of the camera portion to be rotated about the optical axis.

24. A camera driving apparatus according to claim 23, wherein the first detection portion comprises:
 a first magnetic sensor fixed to the fixing unit; and
 a tilt detecting magnet provided to the movable unit,
 the first magnetic sensor detecting a magnetic-force variation caused by a tilt of the tilt detecting magnet, thereby calculating a two-dimensional tilt angle in the panning direction and in the tilting direction of the camera portion.

25. A camera driving apparatus according to claim 24, wherein the first magnetic sensor and the tilt detecting magnet are positioned on the optical axis.

26. A camera driving apparatus according to claim 23, wherein the first detection portion comprises:
 an optical sensor fixed to the fixing unit; and
 an optical detection pattern provided to a part of the first convex partial spherical surface of the movable unit,
 the optical sensor detecting a variation in light entering the optical sensor, the variation being caused by a tilt of the optical detection pattern, thereby calculating a two-dimensional tilt angle in the panning direction and in the tilting direction of the camera portion.

27. A camera driving apparatus according to claim 26, wherein the optical sensor and the optical detection pattern are positioned on the optical axis.

28. A camera driving apparatus according to claim 23, wherein the second detection portion comprises:
 a pair of second magnetic sensors fixed to the fixing unit; and
 a pair of rotation detecting magnets provided to the movable unit,
 the pair of second magnetic sensors detecting a magnetic-force variation caused by rotation of the pair of rotation detecting magnets, thereby calculating the rotation angle of the camera portion.

29. A camera driving apparatus according to claim 28, wherein the pair of second magnetic sensors are arranged symmetrically with respect to the optical axis, and
 wherein the pair of rotation detecting magnets are arranged symmetrically with respect to the optical axis.

30. A camera driving apparatus according to claim 29, wherein, when the movable unit is at a neutral position, in the plane orthogonal to the optical axis, a straight line connecting the pair of second magnetic sensors to each other and the pair of rotation detecting magnets are arranged respectively on straight lines each forming an angle of 45 degrees with respect to the straight line connecting the pair of panning drive magnets and the straight line connecting the pair of tilting drive magnets.

31. A camera driving apparatus according to claim 30, wherein each of the pair of rotation detecting magnets is parallel to a straight line passing through the spherical center of the first convex partial spherical surface in the plane orthogonal to the optical axis and has two poles magnetized in directions opposite to each other, the two poles being arranged in a circumferential direction of a circle about the optical axis.

32. A camera driving apparatus according to claim 28, wherein the pair of second magnetic sensors are provided to the wiring components.

33. A camera driving apparatus according to claim 4, further comprising a viscous member or a magnetic fluid provided between the regulating surface of the drop-off preventing member and the first convex partial spherical surface of the movable unit.

34. A camera driving apparatus according to claim 4, wherein a gap is provided between the regulating surface of the drop-off preventing member and the first convex partial spherical surface of the movable unit, the gap being set so that the first convex partial spherical surface of the movable unit restores a point contact state or a linear contact state by the magnetic attraction force even when the first convex partial spherical surface of the movable unit is spaced apart from the concave portion of the fixing unit.

35. A camera unit, comprising:
 the camera driving apparatus according to claim 1;
 angular velocity sensors for respectively detecting angular velocities about three axes orthogonal to each other of the fixing unit;
 an arithmetic processing portion for generating target rotation angle signals based on outputs from the angular velocity sensors; and
 drive circuits for generating signals for driving the first drive portion and the second drive portion based on the target rotation angle signals.

36. An optical-device drive device, comprising:
 an optical device for receiving or emitting light, the optical device having an optical axis;
 a movable unit comprising at least one attracting magnet, incorporating the optical device, and having an outer shape formed as a first convex partial spherical surface;
 a fixing unit which comprises at least one magnetic body and a concave portion to which at least a part of the movable unit is loosely fitted, and in which a magnetic attraction force of the at least one attracting magnet with respect to the at least one magnetic body causes the first convex partial spherical surface of the movable unit and the concave portion to be held in point contact or linear contact with each other, thereby enabling the movable unit to freely roll about a spherical center of the first convex partial spherical surface;

a panning drive portion for tilting the optical device in a panning direction with respect to the fixing unit, the panning drive portion comprising:
- a pair of panning drive magnets arranged in the movable unit symmetrically with respect to the optical axis;
- a pair of panning magnetic yokes arranged in the fixing unit so as to respectively face the pair of panning drive magnets; and
- a pair of panning drive coils wound respectively around the pair of panning magnetic yokes;

a tilting drive portion for tilting the optical device in a tilting direction, which is orthogonal to the panning direction, with respect to the fixing portion, the tilting drive portion comprising:
- a pair of tilting drive magnets arranged in the movable unit symmetrically with respect to the optical axis;
- a pair of tilting magnetic yokes arranged in the fixing unit so as to respectively face the pair of tilting drive magnets; and
- a pair of tilting drive coils wound respectively around the pair of tilting magnetic yokes;

a detector for detecting:
- a tilt angle of the optical device in the panning direction with respect to the fixing unit; and
- a tilt angle of the optical device in the tilting direction with respect to the fixing unit; and wiring components connected to the optical device and each formed of a flexible printed wiring board;

wherein the wiring components are linearly symmetrically arranged with respect to the optical axis, and are fixed to the movable unit in a direction in which an angle of 45 degrees is formed with respect to a line connecting the pair of tilting drive magnets to each other or a line connecting the pair of panning drive magnets to each other in a plane perpendicular to the optical axis.

* * * * *